(12) United States Patent
Maezawa

(10) Patent No.: US 10,846,519 B2
(45) Date of Patent: Nov. 24, 2020

(54) CONTROL SYSTEM AND CONTROL METHOD

(71) Applicant: Yamaha Corporation, Hamamatsu (JP)

(72) Inventor: Akira Maezawa, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 16/729,676

(22) Filed: Dec. 30, 2019

(65) Prior Publication Data

US 2020/0134297 A1 Apr. 30, 2020

Related U.S. Application Data

(63) Continuation-in-part of application No. 16/252,086, filed on Jan. 18, 2019, now Pat. No. 10,580,393.
(Continued)

(30) Foreign Application Priority Data

Jul. 22, 2016 (JP) .................................. 2016-144944
Sep. 6, 2019 (JP) .................................. 2019-163227

(51) Int. Cl.
*G06K 9/00* (2006.01)
*G06F 3/16* (2006.01)
*G06F 3/01* (2006.01)

(52) U.S. Cl.
CPC ......... *G06K 9/00315* (2013.01); *G06F 3/013* (2013.01); *G06F 3/017* (2013.01); *G06F 3/16* (2013.01)

(58) Field of Classification Search
CPC ..... G06K 9/00315; G06F 3/013; G06F 3/017; G06F 3/16
See application file for complete search history.

(56) References Cited

U.S. PATENT DOCUMENTS 4,341,140 A * 7/1982 Ishida ...................... G10H 1/26
84/711
5,177,311 A * 1/1993 Suzuki ..................... G10H 1/00
84/600
(Continued)

FOREIGN PATENT DOCUMENTS

JP 2014-178395 A 9/2014
JP 2015-79183 A 4/2015

OTHER PUBLICATIONS

Terasaki S. et al., "Proposal of a Score-Following System Using Gaze Information", Entertainment Computing Symposium, Sep. 18, 2015, Japan, pp. 190-192, English translation.*
(Continued)

*Primary Examiner* — Jeffrey Donels
(74) *Attorney, Agent, or Firm* — Crowell & Moring LLP

(57) ABSTRACT

A control system includes: at least one processor; and a memory that is operatively coupled to the at least one processor and that is configured to store instructions executable by the processor, where upon execution of the instructions the processor is caused to: acquire image information including images of a user captured over time; determine whether a preliminary gesture relating to a cue gesture is performed based on a motion of a face of the user and a gaze direction of the user, where the cue gesture is indicative of a timing for generating an event and the motion of the face and the gaze direction are detected from the image information; estimate a timing for generating an event in a case where it is determined that the preliminary gesture is performed; and output a result of the estimation.

14 Claims, 11 Drawing Sheets

Related U.S. Application Data which is a continuation of application No. PCT/JP2017/026271, filed on Jul. 20, 2017.

(56) References Cited

U.S. PATENT DOCUMENTS

| | | | | |
|---|---|---|---|---|
| 5,288,938 | A * | 2/1994 | Wheaton | G06K 9/00335 |
| | | | | 84/600 |
| 5,648,627 | A * | 7/1997 | Usa | G10H 1/0556 |
| | | | | 84/600 |
| 5,663,514 | A * | 9/1997 | Usa | G10H 1/40 |
| | | | | 84/600 |
| 5,890,116 | A * | 3/1999 | Itoh | G10H 1/0008 |
| | | | | 704/260 |
| 5,913,259 | A * | 6/1999 | Grubb | G10H 1/36 |
| | | | | 84/610 |
| 6,166,314 | A * | 12/2000 | Weinstock | G10G 3/04 |
| | | | | 84/477 R |
| 6,919,503 | B2 * | 7/2005 | Nishitani | G10H 1/0058 |
| | | | | 84/633 |
| 7,989,689 | B2 * | 8/2011 | Sitrick | G09B 15/023 |
| | | | | 84/723 |
| 8,445,771 | B2 * | 5/2013 | Sakazaki | G10H 1/0008 |
| | | | | 84/743 |
| 8,586,853 | B2 * | 11/2013 | Sakazaki | G10H 1/053 |
| | | | | 84/743 |
| 9,171,531 | B2 * | 10/2015 | David | G10H 1/40 |
| 10,418,012 | B2 * | 9/2019 | Katz | G10H 1/0008 |
| 2002/0170413 | A1 * | 11/2002 | Nishitani | G10H 1/053 |
| | | | | 84/600 |
| 2011/0214554 | A1 * | 9/2011 | Nakadai | G09B 15/02 |
| | | | | 84/477 R |
| 2014/0260911 | A1 | 9/2014 | Maezawa | |
| 2018/0040161 | A1 * | 2/2018 | Tierney | G06F 3/015 |
| 2019/0012997 | A1 * | 1/2019 | Katz | G10H 1/40 |
| 2019/0156809 | A1 * | 5/2019 | Maezawa | G10H 1/361 |

OTHER PUBLICATIONS

International Search Report (PCT/ISA/210) issued in PCT Application No. PCT/JP2017/026271 dated Sep. 26, 2017 with English translation (five (5) pages).

Japanese-language Written Opinion (PCT/ISA/237) issued in PCT Application No. PCT/JP2017/026271 dated Sep. 26, 2017 (four (4) pages).

Terasaki S. et al., "Proposal of a Score-Following System Using Gaze Information", Entertainment Computing Symposium, Sep. 18, 2015, Japan, pp. 190-192, with English abstract (three (3) pages).

Japanese-language Office Action issued in counterpart Japanese Application No. 2018-528863 dated Jul. 23, 2019 with English translation (10 pages).

Extended European Search Report issued in counterpart European Application No. 17831098.3 dated Dec. 18, 2019 (12 pages).

Dannenberg, "An On-Line Algorithm for Real-Time Accompaniment," In Proceedings of the 1984 International Computer Music Conference (1985), International Computer Music Association, Jun. 1, 1985, pp. 193-198, XP002275377 (six (6) pages).

* cited by examiner

CONTROL SYSTEM AND CONTROL METHOD

CROSS REFERENCE TO RELATED APPLICATIONS

This application is a continuation-in-part application of U.S. patent application Ser. No. 16/252,086, filed on Jan. 18, 2019, which is a continuation application of PCT Application No. PCT/JP2017/026271, filed on Jul. 20, 2017, and which claims priority from Japanese Patent Application No. 2016-144944, filed on Jul. 22, 2016. The current application also claims priority from Japanese Patent Application No. 2019-163227, filed on Sep. 6, 2019. All of the above-referenced applications are hereby expressly incorporated in their entireties.

BACKGROUND

Technical Field

The present disclosure relates to control systems and control methods.

Background Information

Conventionally, there has been proposed a score alignment technique for estimating a score position that is currently being played in a piece of music (hereafter, "playback position") by analyzing a played sound (e.g., Japanese Patent Application Laid-Open Publication No. 2015-79183).

In an ensemble system in which a performer and an automatic player instrument and the like play music together in ensemble, processing is carried out to predict an event timing at which the automatic player instrument is to produce a next sound based on an estimation result of a position at which the performer is playing within a score. However, in a case where an ensemble consisting of human performers is performing a piece of music, a timing may be cued by a gesture such as eye contact made among the performers at a start of the piece of music, a recovery after a fermata, and upon production of a final sound of the piece of music.

SUMMARY

The present disclosure provides a control system and a control method for estimating a timing for generating an event based on facial motion.

In one aspect, a control system includes: at least one processor; and a memory that is operatively coupled to the at least one processor and that is configured to store instructions executable by the processor, where upon execution of the instructions the processor is caused to: acquire image information including images of a user captured over time; determine whether a preliminary gesture relating to a cue gesture is performed based on a motion of a face of the user and a gaze direction of the user, where the cue gesture is indicative of a timing for generating an event and the motion of the face and the gaze direction are detected from the image information; estimate a timing for generating an event in a case where it is determined that the preliminary gesture is performed; and output a result of the estimation.

In another aspect, a control method includes: acquiring image information including images of a user captured over time; determining whether a preliminary gesture relating to a cue gesture is performed based on a motion of a face of the user and a gaze direction of the user, where the cue gesture is indicative of a timing for generating an event and the motion of the face and the gaze direction are detected from the image information; estimating a timing for generating an event in a case where it is determined that the preliminary gesture is performed; and outputting a result of the estimation.

According to the present disclosure, a timing for generating an event can be determined based on facial motion.

DESCRIPTION OF THE EMBODIMENTS

First Embodiment

Figure 1:
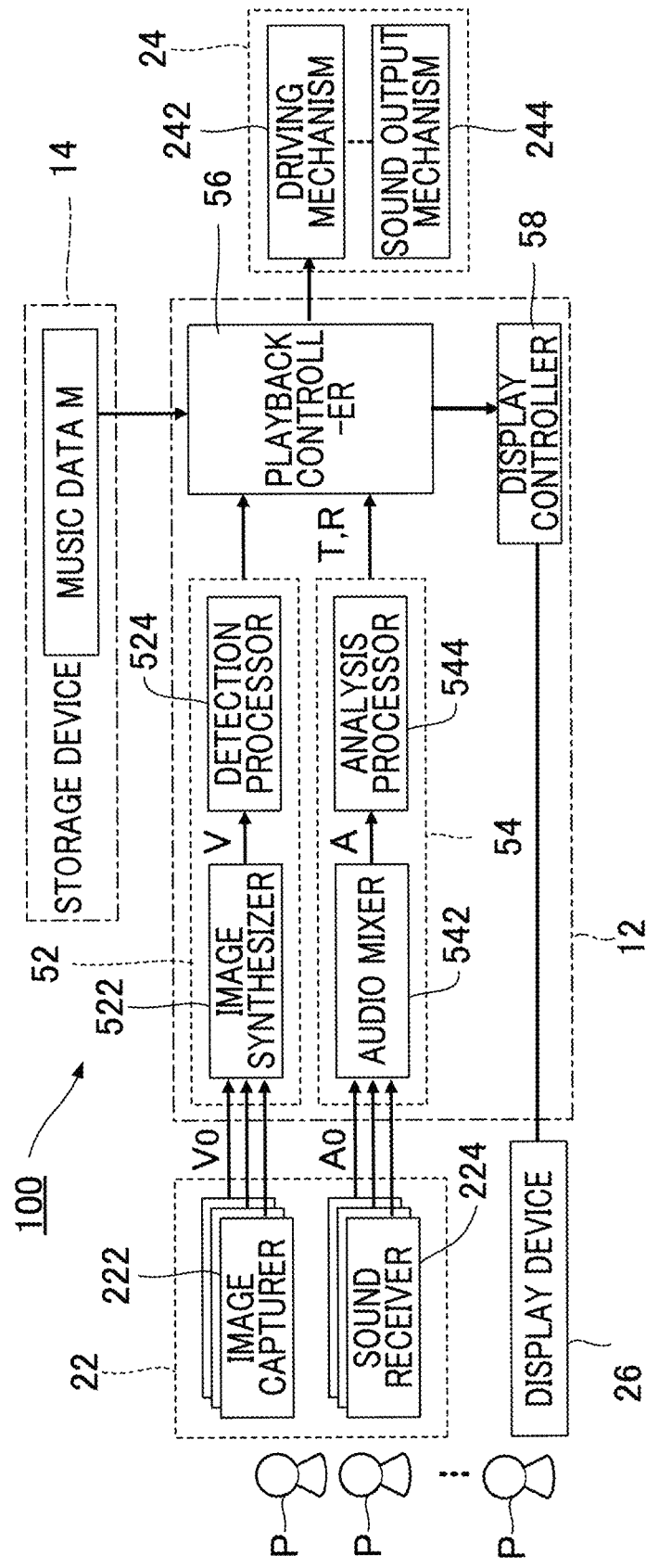
FIG. 1 is a block diagram showing an automatic player system according to an embodiment.

FIG. 1 is a block diagram showing an automatic player system 100 according to a first embodiment of the present disclosure. The automatic player system 100 is provided in a space such as a concert hall where multiple (human) performers P play musical instruments, and is a computer system that executes automatic playback of a piece of music (hereafter, "piece for playback") in conjunction with performance of the piece for playback by the multiple performers P. The performers P are typically performers who play musical instruments, but a singer of the piece for playback can also be a performer P. Thus, the term "performance" in the present specification includes not only playing of a musical instrument but also singing. A person who does not play a musical instrument, for example a conductor of a concert performance or an audio engineer in charge of recording, can be included among the performers P.

As shown in FIG. 1, the automatic player system 100 of the present embodiment includes a controller 12, a storage device 14, a recorder 22, an automatic player apparatus 24, and a display device 26. The controller 12 and the storage device 14 are realized for example by an information processing device such as a personal computer.

The controller 12 is processor circuitry, such as a CPU (Central Processing Unit), and integrally controls the automatic player system 100. A freely-selected form of well-known storage media, such as a semiconductor storage medium and a magnetic storage medium, or a combination of various types of storage media can be employed as the storage device 14. The storage device 14 has stored therein programs executed by the controller 12 and various data used by the controller 12. A storage device 14 separate from the automatic player system 100 (e.g., cloud storage) can be provided, and the controller 12 can write data into or read from the storage device 14 via a network, such as a mobile communication network or the Internet. Thus, the storage device 14 can be omitted from the automatic player system 100.

The storage device 14 of the present embodiment has stored therein music data M. The music data M specifies content of playback of a piece of music to be played by the automatic player. For example, files in compliance with the MIDI (Musical Instrument Digital Interface) Standard format (SMF: Standard MIDI Files) are suitable for use as the music data M. Specifically, the music data M is sequence data that consists of a data array including indication data indicative of the content of playback, and time data indicative of time of an occurrence for each indication data. The indication data specifies a pitch (note number) and loudness (velocity) to indicate various events such as producing sound and silencing of sound. The time data specifies an interval between two consecutive indication data (delta time), for example.

The automatic player apparatus 24 in FIG. 1 is controlled by the controller 12 to automatically play the piece for playback. Specifically, from among multiple performance parts consisting of the piece for playback, a part differing from performance parts (e.g., strings) of the multiple performers P is automatically played by the automatic player apparatus 24. The automatic player apparatus 24 according to the present embodiment is a keyboard instrument (i.e., an automatic player piano) provided with a driving mechanism 242 and a sound producing mechanism 244. The sound producing mechanism 244 is a striking mechanism, as would be provided in a natural piano instrument (an acoustic piano), and produces sound from a string (sound producing body) along with position changes in each key of the keyboard. Specifically, the sound producing mechanism 244 is provided for each key with an action mechanism consisting of a hammer for striking the string, and conveyance members for conveying a change in position of each key to the hammer (e.g., a wippen, jack, and repetition lever). The driving mechanism 242 drives the sound producing mechanism 244 to automatically play a piece for playback. Specifically, the driving mechanism 242 includes multiple driving bodies for changing the position of each key (e.g., actuators such as a solenoid) and drive circuitry for driving each driving body. The driving mechanism 242 drives the sound producing mechanism 244 in accordance with an instruction from the controller 12, whereby a piece for playback is automatically played. It is of note that the automatic player apparatus 24 can be provided with the controller 12 or the storage device 14.

The recorder 22 videotapes the performance of a piece of music by the multiple performers P. As shown in FIG. 1, the recorder 22 of the present embodiment includes image capturers 222 and sound receivers 224. An image capturer 222 is provided for each performer P, and generates an image signal V0 by capturing images of the performer P. The image signal V0 is a signal representative of a moving image of the corresponding performer P. A sound receiver 224 is provided for each performer P, and generates an audio signal A0 by receiving a sound (e.g., instrument sound or singing sound) produced by the performer P's performance (e.g., playing a musical instrument or singing). The audio signal A0 is a signal representative of the waveform of a sound. As will be understood from the foregoing explanation, multiple image signals V0 obtained by capturing images of performers P, and multiple audio signals A0 obtained by receiving the sounds of performance by the performers P are recorded. The audio signals A0 output from an electric musical instrument such as an electric string instrument can be used. In this regard, the sound receivers 224 can be omitted.

The controller 12 executes a program stored in the storage device 14, thereby realizing a plurality of functions for enabling automatic playback of a piece for playback (a cue detector 52, a performance analyzer 54, a playback controller 56, and a display controller 58). The functions of the controller 12 can be realized by a set of multiple devices (i.e., system). Alternatively, part or all of the functions of the controller 12 can be realized by dedicated electronic circuitry. Furthermore alternatively, a server apparatus provided in a location that is remote from a space such as a concert hall where the recorder 22, the automatic player apparatus 24, and the display device 26 are sited can realize part or all of the functions of the controller 12.

Figure 2:
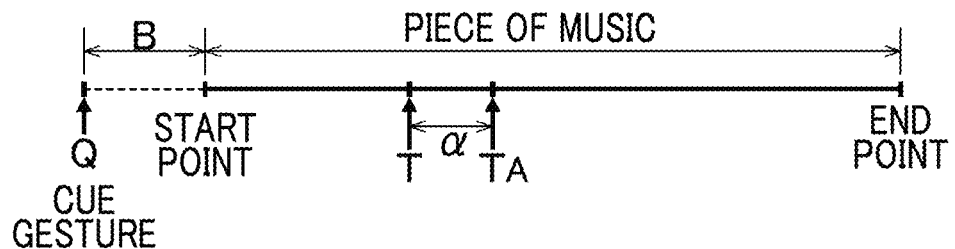
FIG. 2 is an explanatory diagram illustrating cue gestures and playback positions.

Each performer P performs a gesture for cueing performance of a piece for playback (hereafter, "cue gesture"). The cue gesture is a motion (gesture) for indicating a time point on the time axis. Examples are a cue gesture of a performer P raising his/her instrument, or a cue gesture of a performer P moving his/her body. For example, as shown in FIG. 2, a specific performer P who leads the performance of the piece performs a cue gesture at a time point Q, which is a predetermined period B (hereafter, "preparation period") prior to the entry timing at which the performance of the piece for playback should be started. The preparation period B is for example a period consisting of a time length corresponding to a single beat of the piece for playback. Accordingly, the time length of the preparation period B varies depending on the playback speed (tempo) of the piece for playback. For example, the greater the playback speed is, the shorter the preparation period B is. The performer P performs a cue gesture at a time point that precedes the entry timing of a piece for playback by the preparation period B corresponding to a single beat, and then starts playing the piece for playback, where the preparation period B corresponding a single beat depends on a playback speed determined for the piece for playback. The cue gesture signals the other performers P to start playing, and is also used as a trigger for the automatic player apparatus 24 to start automatic playback. The time length of the preparation period B can be freely determined, and can, for example, consist of a time length corresponding to multiple beats.

Figure 3:
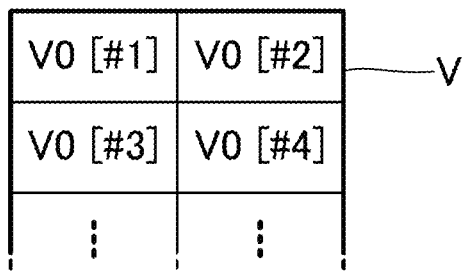
FIG. 3 is an explanatory diagram illustrating image synthesis by an image synthesizer.

The cue detector 52 in FIG. 1 detects a cue gesture by a performer P. Specifically, the cue detector 52 detects a cue gesture by analyzing an image obtained by each image capturer 222 that captures an image of a performer P. As shown in FIG. 1, the cue detector 52 of the present embodiment is provided with an image synthesizer 522 and a detection processor 524. The image synthesizer 522 synthesizes multiple image signals V0 generated by a plurality of image capturers 222, to generate an image signal V. The image signal V is a signal representative of an image in which multiple moving images (#1, #2, #3, . . . ) represented by each image signal V0 are arranged, as shown in FIG. 3. That is, an image signal V representative of moving images of the multiple performers P is supplied from the image synthesizer 522 to the detection processor 524.

The detection processor 524 detects a cue gesture of any one of the performers P by analyzing an image signal V generated by the image synthesizer 522. The cue gesture detection by the detection processor 524 can employ a known image analysis technique including an image recognition process that extracts from an image an element (e.g., a body or musical instrument) that a performer P moves when making a cue gesture, and also including a moving object detection process of detecting the movement of the element. Also, an identification model such as neural networks or multiple trees can be used for detecting a cue gesture. For example, a characteristics amount extracted from image signals obtained by capturing images of the multiple performers P can be used as fed learning data, with the machine learning (e.g., deep learning) of an identification model being executed in advance. The detection processor 524 applies, to the identification model that has undergone machine learning, a characteristics amount extracted from an image signal V in real-time automatic playback, to detect a cue gesture.

The performance analyzer 54 in FIG. 1 sequentially estimates (score) positions in the piece for playback at which the multiple performers P are currently playing (hereafter, "playback position T") in conjunction with the performance by each performer P. Specifically, the performance analyzer 54 estimates each playback position T by analyzing a sound received by each of the sound receivers 224. As shown in FIG. 1, the performance analyzer 54 according to the present embodiment includes an audio mixer 542 and an analysis processor 544. The audio mixer 542 generates an audio signal A by mixing audio signals A0 generated by the sound receivers 224. Thus, the audio signal A is a signal representative of a mixture of multiple types of sounds represented by different audio signals A0.

The analysis processor 544 estimates each playback position T by analyzing the audio signal A generated by the audio mixer 542. For example, the analysis processor 544 matches the sound represented by the audio signal A against the content of playback of the piece for playback indicated by the music data M, to identify the playback position T. Furthermore, the analysis processor 544 according to the present embodiment estimates a playback speed R (tempo) of the piece for playback by analyzing the audio signal A. For example, the analysis processor 544 identifies the playback speed R from temporal changes in the playback positions T (i.e., changes in the playback position T in the time axis direction). For estimation of the playback position T and playback speed R by the analysis processor 544, a known audio analysis technique (score alignment or score following) can be freely employed. For example, analysis technology such as that disclosed in Japanese Patent Application Laid-Open Publication No. 2015-79183 can be used for the estimation of playback positions T and playback speeds R. Also, an identification model such as neural networks or multiple trees can be used for estimating playback positions T and playback speeds R. For example, a characteristics amount extracted from the audio signal A obtained by receiving the sound of playing by the performers P can be used as fed learning data, with machine learning (e.g., deep learning) for generating an identification model being executed prior to the automated performance. The analysis processor 544 applies, to the identification model having undergone machine learning, a characteristics amount extracted from the audio signal A in real-time automatic playback, to estimate playback positions T and playback speeds R.

The cue gesture detection made by the cue detector 52 and the estimation of playback positions T and playback speeds R made by the performance analyzer 54 are executed in real time in conjunction with playback of the piece for playback by the performers P. For example, the cue gesture detection and estimation of playback positions T and playback speeds R are repeated in a predetermined cycle. The cycle for the cue gesture detection and that for the playback position T and playback speed R estimation can either be the same or different.

The playback controller 56 in FIG. 1 causes the automatic player apparatus 24 to execute automatic playback of the piece for playback synchronous with the cue gesture detected by the cue detector 52 and the playback positions T estimated by the performance analyzer 54. Specifically, the playback controller 56 instructs the automatic player apparatus 24 to start automatic playback when a cue gesture is detected by the cue detector 52, while it indicates to the automatic player apparatus 24 a content of playback specified by the music data M for a time point within the piece for playback that corresponds to the playback position T. Thus, the playback controller 56 is a sequencer that sequentially supplies to the automatic player apparatus 24 indication data contained in the music data M of the piece for playback. The automatic player apparatus 24 performs the automatic playback of the piece for playback in accordance with instructions from the playback controller 56. Since the playback position T moves forward within the piece for playback as playing by the multiple performers P progresses, the automatic playback of the piece for playback by the automatic player apparatus 24 progresses as the playback position T moves. As will be understood from the foregoing description, the playback controller 56 instructs the automatic player apparatus 24 to automatically play the music such that the playback tempo and timing of each sound synchronize to the performance by the multiple performers P while maintaining musical expression, for example, with respect to a loudness of each note or an expressivity of a phrase in the piece for playback, to the content specified by the music data M. Accordingly, if music data M is used to specify a given performer's performance (e.g., a performer who is no longer alive), it is possible to create an impression that the given performer and actual performers P are collaborating as a musical ensemble by synchronizing the playing of the performers with each other together with the musical expression peculiar to the given performer, which is faithfully reproduced in the automated playback.

It takes about several hundred milliseconds for the automatic player apparatus 24 to actually output a sound (e.g., for the hammer of the sound producing mechanism 244 to strike a string) from a time point at which the playback controller 56 instructs the automatic player apparatus 24 to execute automatic playback upon output of indication data. Thus, inevitably, there is a slight lag in the actual sound output by the automatic player apparatus 24 from a time point at which the instruction is provided by the playback controller 56. Therefore, in a configuration in which the playback controller 56 instructs the automatic player apparatus 24 to play at a position of the playback position T within the piece for playback estimated by the performance analyzer 54, the output of the sound by the automatic player apparatus 24 will lag relative to the performance by the multiple performers P.

Thus, as shown in FIG. 2, the playback controller 56 according to the present embodiment instructs the automatic player apparatus 24 to play at a position corresponding to a time point $T_A$ within the piece for playback. Here, the time point $T_A$ is ahead (is a point of time in the future) of the playback position T as estimated by the performance analyzer 54. That is, the playback controller 56 reads ahead indication data in the music data M of the piece for playback, as a result of which the lag is obviated by the sound output being made synchronous with the playback of the performers P (e.g., such that a specific note in the piece for playback is played essentially simultaneously by the automatic player apparatus 24 and each of the performers P).

Figure 4:
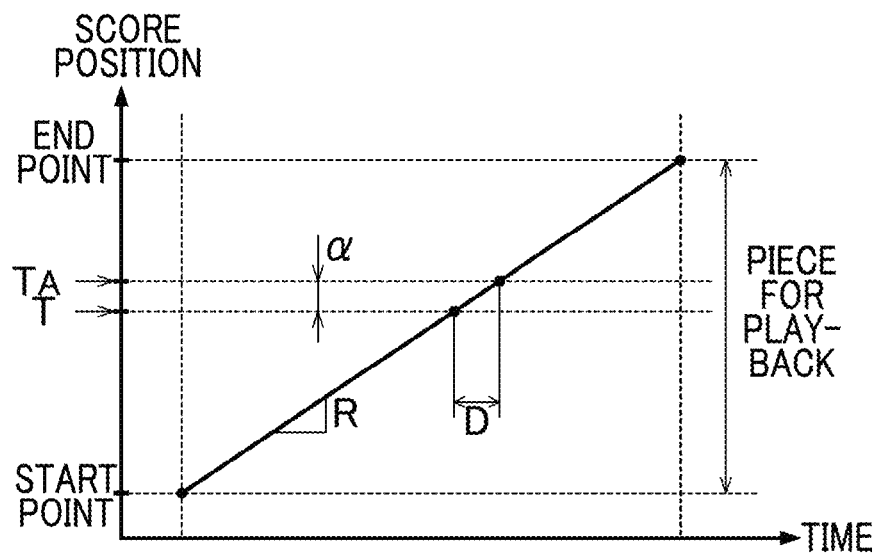
FIG. 4 is an explanatory diagram illustrating a relation between playback positions in a piece for playback and score positions instructed for automatic playback.

FIG. 4 is an explanatory diagram illustrating temporal changes in the playback position T. The amount of change in the playback position T per unit time (the slope of a straight line in FIG. 4) corresponds to the playback speed R. For convenience, FIG. 4 shows a case where the playback speed R is maintained constant.

As shown in FIG. 4, the playback controller 56 instructs the automatic player apparatus 24 to play at a position of a time point $T_A$ that is ahead of (later than) the playback position T by the adjustment amount α within the piece for playback. The adjustment amount α is set to be variable, and is dependent on the delay amount D corresponding to a delay from a time point at which the playback controller 56 provides an instruction for automatic playback until the automatic player apparatus 24 is to actually output sound, and is also dependent on the playback speed R estimated by the performance analyzer 54. Specifically, the playback controller 56 sets as the adjustment amount α the length of a segment for the playback of the piece to progress at the playback speed R during the period corresponding to the delay amount D. Accordingly, the faster the playback speed R (the steeper the slope of the straight line in FIG. 4) is, the greater value of the adjustment amount α is. In FIG. 4, although it is assumed that the playback speed R remains constant throughout the piece for playback, in actuality the playback speed R can vary. Thus, the adjustment amount α varies with elapse of time, and is linked to the variable playback speed R.

The delay amount D is set in advance as a predetermined value, for example, a value within a range of several tens to several hundred milliseconds, depending on a measurement result of the automatic player apparatus 24. In reality, the delay amount D at the automatic player apparatus 24 can also vary depending on a pitch or loudness played. Thus, the delay amount D (and also the adjustment amount α depending on the delay amount D) can be set as variable depending on a pitch or loudness of a note to be automatically played back.

Figure 5:
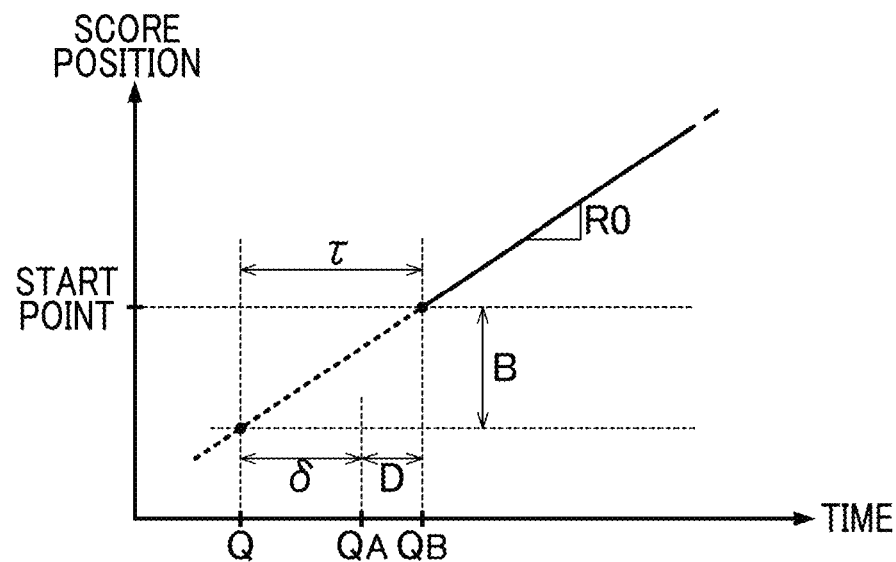
FIG. 5 is an explanatory diagram illustrating a relation between a score position of a cue gesture and the start timing of performance in a piece for playback.

In response to detection of a cue gesture by the cue detector 52, which acts as a trigger, the playback controller 56 instructs the automatic player apparatus 24 to start automatic playback of the piece for playback. FIG. 5 is an explanatory diagram illustrating a relation between a cue gesture and automatic playback. As shown in FIG. 5, at the time point $Q_A$, the playback controller 56 instructs the automatic player apparatus 24 to perform automatic playback; the time point $Q_A$ being a time point at which a time length δ has elapsed since the time point Q at which a cue gesture is detected. The time length δ is a time length obtained by deducting a delay amount D of the automatic playback from a time length T corresponding to the preparation period B. The time length τ of the preparation period B varies depending on the playback speed R of the piece for playback. Specifically, the faster the playback speed R (the steeper the slope of the straight line in FIG. 5) is, the shorter the time length τ of the preparation period B is. However, since at the time point $Q_A$ of a cue gesture the performance of the piece for playback has not started, hence, the playback speed R is not estimated. The playback controller 56 calculates the time length τ for the preparation period B depending on the normal playback speed (standard tempo) R0 assumed for the playback of the piece. For example, the playback speed R0 is specified in the music data M. However, the velocity commonly recognized with respect to the piece for playback by the performers P (for example, the velocity determined in rehearsals) can be set as the playback speed R0.

As described in the foregoing, the playback controller 56 instructs automatic playback at the time point $Q_A$, which is a time point at which the time length δ (δ=τ−D) has elapsed since the time point Q at which a cue gesture is detected. Thus, the output of the sound by the automatic player apparatus 24 starts at a time point $Q_B$ at which the preparation period B has elapsed since the time point Q at which the cue gesture is made (i.e., a time point at which the multiple performers P start the performance). That is, automatic playback by the automatic player apparatus 24 starts almost simultaneously with the start of the performance of the piece to be played by the performers P. The above is an example of automatic playback control by the playback controller 56 according to the present embodiment.

The display controller 58 in FIG. 1 causes an image G that visually represents the progress of automatic playback by the automatic player apparatus 24 (hereafter "playback image") on the display device 26. Specifically, the display controller 58 causes the display device 26 to display the playback image G by generating image data representative of the playback image G and outputting it to the display device 26. The display device 26 displays the playback image G indicated by the display controller 58. A liquid display panel or a projector is an example of the display device 26. While playing the music for playback, the performers P can at any time view the playback image G displayed by the display device 26.

Figure 6:
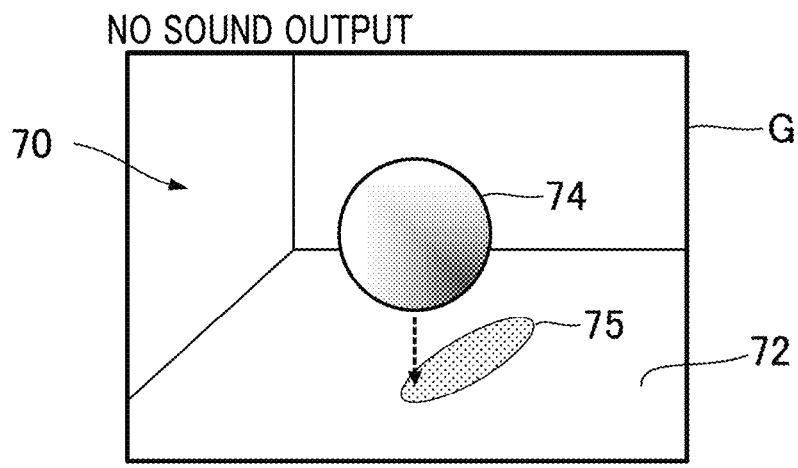
FIG. 6 is an explanatory diagram illustrating a playback image.
Figure 7:
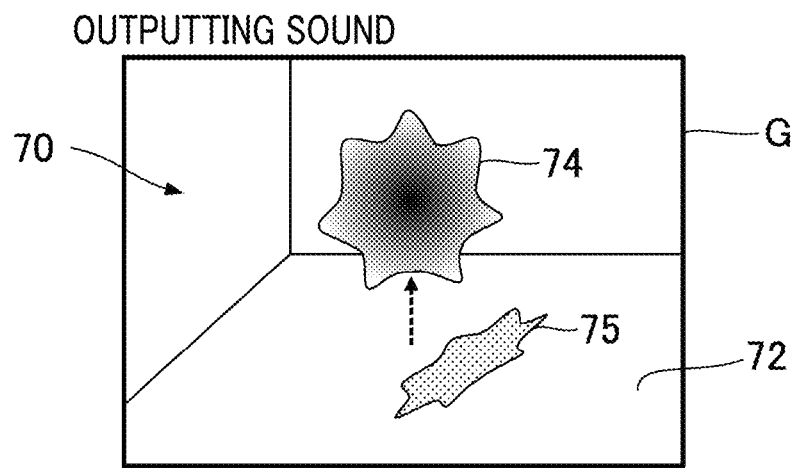
FIG. 7 is an explanatory diagram illustrating a playback image.

According to the present embodiment, the display controller 58 causes the display device 26 to display the playback image G in the form of a moving image that dynamically changes in conjunction with the automatic playback by the automatic player apparatus 24. FIG. 6 and FIG. 7 each show an example of the displayed playback image G. As shown in FIG. 6 and FIG. 7, the playback image G is a three-dimensional image in which a display object 74 (object) is arranged in a virtual space 70 that has a bottom surface 72. As shown in FIG. 6, the display object 74 is a sphere-shaped three-dimensional object that floats within the virtual space 70 and that descends at a predetermined velocity. Displayed on the bottom surface 72 of the virtual space 70 is a shadow 75 of the display object 74. As the display object 74 descends, the shadow 75 on the bottom surface 72 approaches the display object 74. As shown in FIG. 7, the display object 74 ascends to a predetermined height in the virtual space 70 at a time point at which the sound output by the automatic player apparatus 24 starts, while the shape of the display object 74 deforms irregularly. When the automatic playback sound stops (is silenced), the irregular deformation of the display object 74 stops, and the display object 74 is restored to the initial shape (sphere) shown in FIG. 6. Then, it transitions to a state in which the display object 74 descends at the predetermined velocity. The above movement (ascending and deforming) of the display object 74 is repeated every time a sound is output by the automatic playback. For example, the display object 74 descends before the start of the playback of the piece for playback, and the movement of the display object 74 switches from descending to ascending at a time point at which the sound corresponding to an entry timing note of the piece for playback is output by the automatic playback. Accordingly, a performer P by viewing the playback image G displayed on the display device 26 is able to understand a timing of the sound output by the automatic player apparatus 24 upon noticing a switch from descent to ascent of the display object 74.

The display controller 58 according to the present embodiment controls the display device 26 so that the playback image G is displayed. The delay from a time at which the display controller 58 instructs the display device 26 to display or change an image until the reflection of the instruction in the display image by the display device 26 is sufficiently small compared to the delay amount D of the automatic playback by the automatic player apparatus 24. Accordingly, the display controller 58 causes the display device 26 to display a playback image G dependent on the content of playback of the playback position T, which is itself estimated by the performance analyzer 54 within the piece for playback. Accordingly, as described above, the playback image G dynamically deforms in synchronization with the actual output of the sound by the automatic player apparatus 24 (a time point delayed by the delay amount D from the instruction by the playback controller 56). That is, the movement of the display object 74 of the playback image G switches from descending to ascending at a time point at which the automatic player apparatus 24 actually starts outputting a sound of a note of the piece for playback. Accordingly, each performer P is able to visually perceive a time point at which the automatic player apparatus 24 outputs the sound of each note of the piece for playback.

Figure 8:
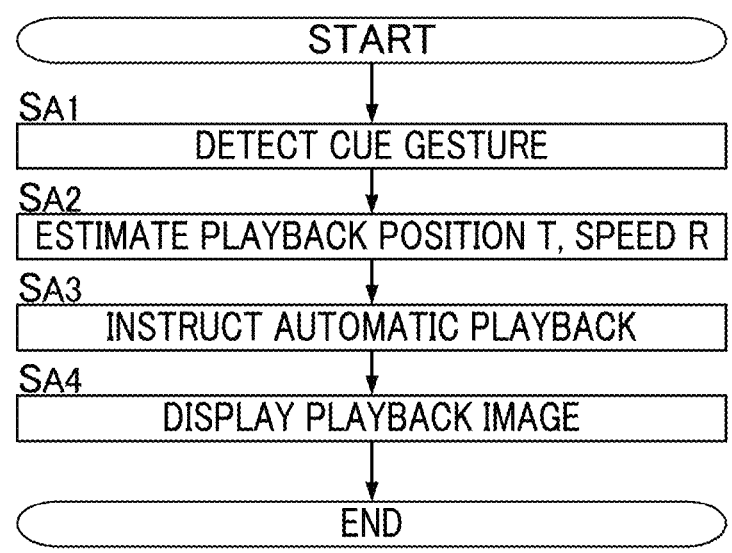
FIG. 8 is a flowchart illustrating an operation of a controller.

FIG. 8 is a flowchart illustrating an operation of the controller 12 of the automatic player system 100. For example, the process of FIG. 8 is triggered by an interrupt signal that is generated in a predetermined cycle. The process is performed in conjunction with the performance of a piece for playback by the performers P. Upon start of the process shown in FIG. 8, the controller 12 (the cue detector 52) analyzes plural image signals V0 respectively supplied from the image capturers 222, to determine whether a cue gesture made by any one of the performers P is detected (SA1). The controller 12 (the performance analyzer 54) analyzes audio signals A0 supplied from the sound receivers 224, to estimate the playback position T and the playback speed R (SA2). It is of note that the cue gesture detection (SA1) and the estimation of the playback position T and playback speed R (SA2) can be performed in reverse order.

The controller 12 (the playback controller 56) instructs the automatic player apparatus 24 to perform automatic playback in accordance with the playback position T and the playback speed R (SA3). Specifically, the controller 12 causes the automatic player apparatus 24 to automatically play the piece for playback synchronous with a cue gesture detected by the cue detector 52 and with progression of playback positions T estimated by the performance analyzer 54. Also, the controller 12 (the display controller 58) causes the display device 26 to display a playback image G that represents the progress of the automatic playback (SA4).

In the above-described embodiment, the automatic playback by the automatic player apparatus 24 is performed such that the automatic playback synchronizes to a cue gesture by a performer P and the progression of playback positions T, while a playback image G that represents the progress of the automatic playback by the automatic player apparatus 24 is displayed on the display device 26. Thus, a performer P is able to visually perceive the progress of the automatic playback by the automatic player apparatus 24 and incorporate the progress into his/her playing. Thus, a natural sounding musical ensemble can be realized in which the performance by the performers P and the automatic playback by the automatic player apparatus 24 cooperate with each other. In the present embodiment in particular, since a playback image G that dynamically changes depending on the content of playback by the automatic playback is displayed on the display device 26, there is an advantage that the performer P is able to visually and intuitively perceive progress of the automatic playback.

Also, in the present embodiment, the content of playback corresponding to a time point $T_A$ that is temporally ahead of a playback position T as estimated by the performance analyzer 54 is indicated to the automatic player apparatus 24. Therefore, the performance by the performer P and the automatic playback can be highly accurately synchronized to each other even in a case where the actual output of the sound by the automatic player apparatus 24 lags relative to the playback instruction given by the playback controller 56. Furthermore, the automatic player apparatus 24 is instructed to play at a position corresponding to a time point $T_A$ that is ahead of a playback position T by an adjustment amount α that varies depending on a playback speed R estimated by the performance analyzer 54. Accordingly, for example, even in a case where the playback speed R varies, the performance by the performer and the automatic playback can be highly accurately synchronized.

Second Embodiment

A second embodiment of the present disclosure will now be described. In each of configurations described below, elements having substantially the same actions or functions as those in the first embodiment will be denoted by the same reference symbols as those used in the description of the first embodiment, and detailed description thereof will be omitted as appropriate.

Figure 9:
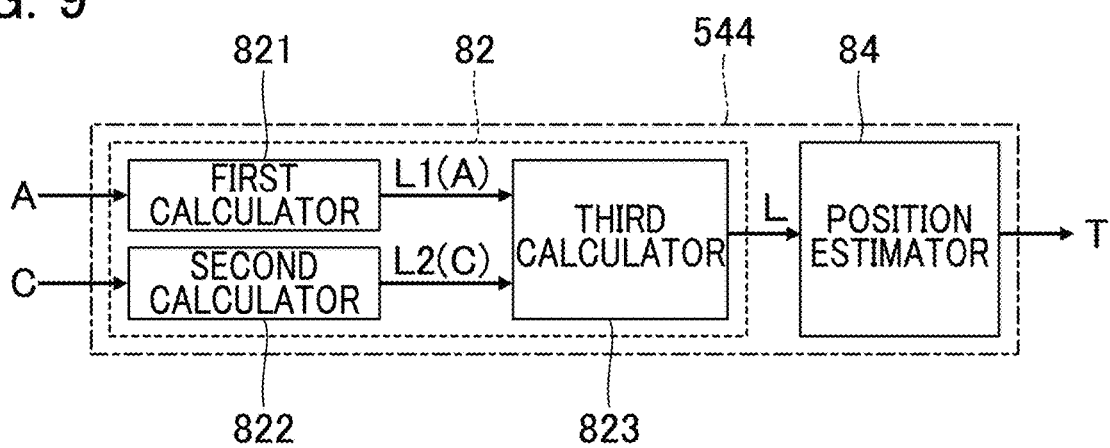
FIG. 9 is a block diagram showing an analysis processor according to a second embodiment.
Figure 10:
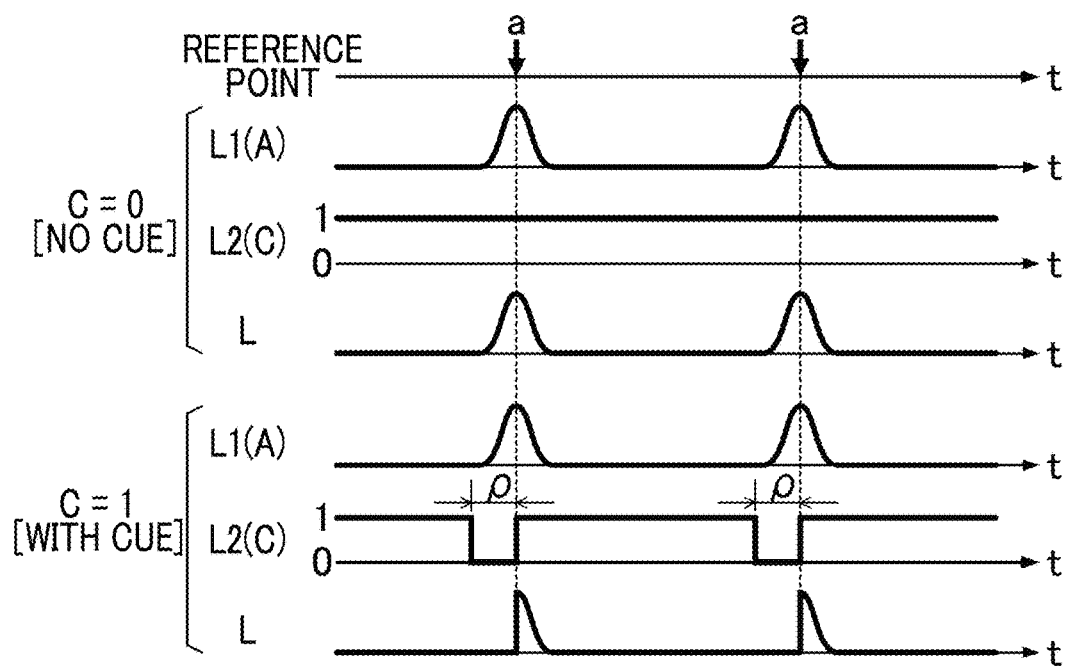
FIG. 10 is an explanatory diagram illustrating an operation of the analysis processor according to the second embodiment.

FIG. 9 is a block diagram showing an analysis processor 544 according to the second embodiment. As shown in FIG. 9, the analysis processor 544 of the second embodiment has a likelihood calculator 82 and a position estimator 84. FIG. 10 is an explanatory diagram illustrating an operation of the likelihood calculator 82 according to the second embodiment.

The likelihood calculator 82 calculates a likelihood of observation L at each of multiple time points t within a piece for playback in conjunction with the performance of the piece for playback by performers P. That is, the distribution of likelihood of observation L across the multiple time points t within the piece for playback (hereafter, "observation likelihood distribution") is calculated. An observation likelihood distribution is calculated for each unit segment (frame) obtained by dividing an audio signal A on the time axis. For an observation likelihood distribution calculated for a single unit segment of the audio signal A, a likelihood of observation L at a freely selected time point t is an index of probability that a sound represented by the audio signal A of the unit segment is output at the time point t within the piece for playback. In other words, the likelihood of observation L is an index of probability that the multiple performers P are playing at a position corresponding to a time point t within the piece for playback. Therefore, in a case where the likelihood of observation L calculated with respect to a freely-selected unit segment is high, the corresponding time point t is likely to be a position at which a sound represented by the audio signal A of the unit segment is output. It is of note that two consecutive unit segments can overlap on the time axis.

As shown in FIG. 9, the likelihood calculator 82 of the second embodiment includes a first calculator 821, a second calculator 822, and a third calculator 823. The first calculator 821 calculates a first likelihood L1(A), the second calculator 822 calculates a second likelihood L2(C). The third calculator 823 calculates a distribution of likelihood of observation L by multiplying together the first likelihood L1(A) calculated by the first calculator 821 and the second likelihood L2(C) calculated by the second calculator 822. Thus, the likelihood of observation L is given as a product of the first likelihood L1(A) and the second likelihood L2(C) (L=L1(A)*L2(C)).

The first calculator 821 matches an audio signal A of each unit segment against the music data M of the piece for playback, thereby to calculate a first likelihood L1(A) for each of multiple time points t within the piece for playback. That is, as shown in FIG. 10, the distribution of the first likelihood L1(A) across plural time points t within the piece for playback is calculated for each unit segment. The first likelihood L1(A) is a likelihood calculated by analyzing the audio signal A. The first likelihood L1(A) calculated with respect to a time point t by analyzing a unit segment of the audio signal A is an index of probability that a sound represented by the audio signal A of the unit segment is output at the time point t within the piece for playback. Of the multiple time points t on the time axis within a unit segment of the audio signal A, the peak of the first likelihood L1(A) is present at a time point t that is likely to be a playback position of the audio signal A of the same unit segment. A technique disclosed in Japanese Patent Application Laid-Open Publication No. 2014-178395, for example, can be appropriate for use as a method for calculating a first likelihood L1(A) from an audio signal A.

The second calculator 822 of FIG. 9 calculates a second likelihood L2(C) that depends on whether or not a cue gesture is detected. Specifically, the second likelihood L2(C) is calculated depending on a variable C that represents a presence or absence of a cue gesture. The variable C is notified from the cue detector 52 to the likelihood calculator 82. The variable C is set to 1 if the cue detector 52 detects a cue gesture; whereas the variable C is set to 0 if the cue detector 52 does not detect a cue gesture. It is of note that the value of the variable C is not limited to the two values, 0 and 1. For example, the variable C that is set when a cue gesture is not detected can be a predetermined positive value (although, this value should be below the value of the variable C that is set when a cue gesture is detected).

As shown in FIG. 10, multiple reference points a are specified on the time axis of the piece for playback. A reference point a is for example a start time point of a piece of music, or a time point at which the playback resumes after a long rest as indicated by fermata or the like. For example, a time of each of the multiple reference points a within the piece for playback is specified by the music data M.

As shown in FIG. 10, the second likelihood L2(C) is maintained to 1 in a unit segment where a cue gesture is not detected (C=0). On the other hand, in a unit segment where a cue gesture is detected (C=1), the second likelihood L2(C) is set to 0 (an example of a second value) in a period ρ of a predetermined length that is prior to each reference point a on the time axis (hereafter, "reference period"). The second likelihood L2(C) is set to 1 (example of a first value) in a period other than each reference period ρ. The reference period ρ is set to a time length consisting of around one or two beats of the piece for playback, for example. As already described, the likelihood of observation L is calculated by multiplying together the first likelihood L1(A) and the second likelihood L2(C). Thus, when a cue gesture is detected, the likelihood of observation L is decreased to 0 in each reference period ρ prior to each of the multiple reference points a specified in the piece for playback. On the other hand, when a cue gesture is not detected, the second likelihood L2(C) remains as 1, and accordingly, the first likelihood L1(A) is calculated as the likelihood of observation L.

The position estimator 84 in FIG. 9 estimates a playback position T depending on a likelihood of observation L calculated by the likelihood calculator 82. Specifically, the position estimator 84 calculates a posterior distribution of playback positions T from the likelihood of observation L, and estimates a playback position T from the posterior distribution. The posterior distribution of playback positions T is the probability distribution of posterior probability that, under a condition that the audio signal A in the unit segment has been observed, a time point at which the sound of the unit segment is output was a position t within the piece for playback. To calculate the posterior distribution using the likelihood of observation L, known statistical processing such as Bayesian estimation using the hidden semi-Markov model (HSMM) for example, as disclosed in Japanese Patent Application Laid-Open Publication No. 2015-79183 can be used.

As described above, since the likelihood of observation L is set to 0 in a reference period ρ prior to the reference point a corresponding to a cue gesture, the posterior distribution becomes effective in a period on or after the reference point a. Therefore, a time point that matches or comes after the reference point a corresponding to a cue gesture is estimated as a playback position T. Furthermore, the position estimator 84 identifies the playback speed R from time changes in the playback positions T. A configuration other than the analysis processor 544 and the operation other than that performed by the analysis processor 544 are the same as those in the first embodiment.

Figure 11:
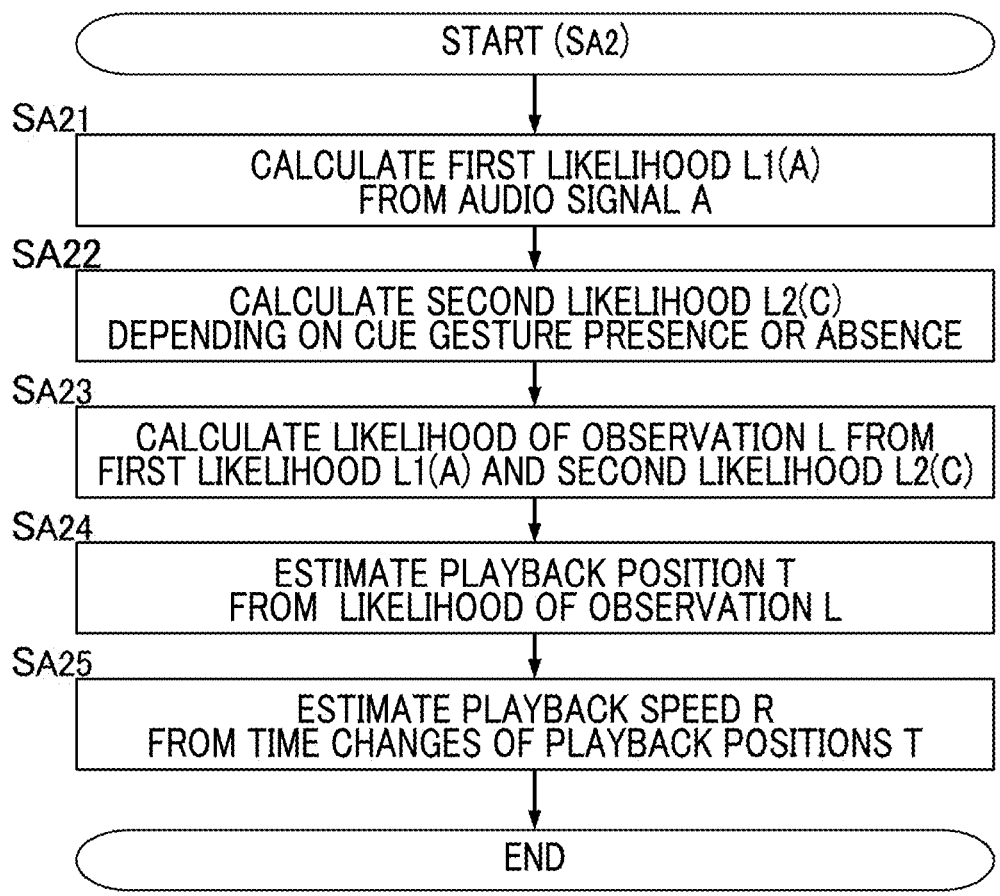
FIG. 11 is a flowchart illustrating an operation of a likelihood calculator according to the second embodiment.

FIG. 11 is a flowchart illustrating the details of a process (FIG. 8, Step SA2) for the analysis processor 544 to estimate the playback position T and the playback speed R. The process of FIG. 11 is performed for each unit segment on the time axis in conjunction with the performance of the piece for playback by performers P.

The first calculator 821 analyzes the audio signal A in the unit segment, thereby to calculate the first likelihood L1(A) for each of the time points t within the piece for playback (SA21). Also, the second calculator 822 calculates the second likelihood L2(C) depending on whether or not a cue gesture is detected (SA22). It is of note that the calculation of the first likelihood L1(A) by the first calculator 821 (SA21) and the calculation of the second likelihood L2(C) by the second calculator 822 (SA22) can be performed in reverse order. The third calculator 823 multiplies the first likelihood L1(A) calculated by the first calculator 821 and the second likelihood L2(C) calculated by the second calculator 822 together, to calculate the distribution of the likelihood of observation L (SA23).

The position estimator 84 estimates a playback position T based on the observation likelihood distribution calculated by the likelihood calculator 82 (SA24). Furthermore, the position estimator 84 calculates a playback speed R from the time changes of the playback positions T (SA25).

As described in the foregoing, in the second embodiment, cue gesture detection results are taken into account for the estimation of a playback position T in addition to the analysis results of an audio signal A. Therefore, playback positions T can be estimated highly accurately compared to a case where only the analysis results of the audio signal A are considered, for example. For example, a playback position T can be highly accurately estimated at the start time point of the piece of music or a time point at which the performance resumes after a rest. Also, in the second embodiment, in a case where a cue gesture is detected, a likelihood of observation L decreases within a reference period ρ corresponding to a reference point a, with respect to which a cue gesture is detected, from among plural reference points a set to the piece for playback. That is, a time point at which a cue gesture is detected during a period other than reference periods ρ is not reflected in the estimation of the performance time point T. Thus, the present embodiment has an advantage in that erroneous estimation of performance time points T in turn caused by erroneous detection of a cue gesture can be minimized.

Modifications

Various modifications can be made to the embodiments described above.

Specific modifications will be described below. Two or more modifications can be freely selected from the following and combined as appropriate so long as they do not contradict one another.

(1) In the above embodiments, a cue gesture detected by the cue detector 52 serves as a trigger for automatic playback of the piece for playback. However, a cue gesture can be used for controlling automatic playback of a time point in the midst of the piece for playback. For example, at a time point at which the performance resumes after a long rest ends in the piece for playback, the automatic playback of the piece for playback resumes with a cue gesture serving as a trigger, similarly to each of the above embodiments. For example, similarly to the operation described with reference to FIG. 5, a particular performer P performs a cue gesture at a time point Q that precedes, by the preparation period B, a time point at which the performance resumes after a rest within a piece for playback. Then, at a time point at which a time length δ depending on a delay amount D and on a playback speed R elapses from the time point Q, the playback controller 56 resumes instruction to the automatic player apparatus 24 to perform automatic playback. It is of note that since the playback speed R is already estimated at a time point in the midst of the piece for playback, the playback speed R estimated by the performance analyzer 54 is applied in setting the time length δ.

In the piece for playback, those periods in which cue gestures can be performed are able to be determined from a content of the piece in advance. Accordingly, specific periods during which cue gestures are likely to be performed, of the piece for playback, (hereafter, "monitoring period") can be monitored by the cue detector 52 for a presence or absence of a cue gesture. For example, segment specification data that specifies a start and an end for each of monitoring periods assumed in the piece for playback is stored in the storage device 14. The segment specification data can be contained in the music data M. The cue detector 52 monitors occurrence of a cue gesture in a case where the playback position T is within each monitoring period, of the piece for playback, specified in the segment specification data; whereas the cue detector 52 stops monitoring when the playback position T is outside the monitoring period. According to the above configuration, since a cue gesture is detected within a period limited to the monitoring periods of the piece for playback, the present configuration has an advantage in that the processing burden of the cue detector 52 is reduced compared to a configuration in which a presence or absence of a cue gesture is monitored throughout the piece for playback. Moreover, a possibility can be reduced of erroneously detecting a cue gesture during a period in which, of the piece for playback, a cue gesture cannot be performed.

(2) In the above-described embodiments, the entirety of the image represented by the image signal V (FIG. 3) is analyzed for detection of a cue gesture. However, a specific region of the image represented by the image signal V (hereafter, "monitoring region") can be monitored by the cue detector 52 for the presence or absence of a cue gesture. For example, the cue detector 52 selects as a monitoring region a range that includes a specific performer P who is expected to perform a cue gesture out of the image represented by the image signal V for detecting a cue gesture within the monitoring region. Areas outside the monitoring region are not monitored by the cue detector 52. By the above configuration, a cue gesture is detected only in monitoring regions. This configuration thus has an advantage in that a processing burden of the cue detector 52 is reduced compared to a configuration in which a presence or absence of a cue gesture is monitored within the entire image represented by image signal V. Moreover, a possibility can be reduced of erroneously determining, as a cue gesture, a gesture by a performer P who is not actually performing a cue gesture.

As illustrated in the above modification (1), it can be assumed that a cue gesture is performed a multiple number of times during performance of the piece. Thus, a performer P who performs a cue gesture can change for one or more of cue gestures. For example, a performer P1 performs a cue gesture before the start of the piece for playback, and a performer P2 performs a cue gesture during the piece for playback. Accordingly, a configuration can be in which the position (or the size) of a monitoring region within the image represented by the image signal V changes over time. Since performers P who perform cue gestures are decided before the performance, region specification data, for example, for chronologically specifying the positions of the monitoring region are stored in the storage device 14 in advance. The cue detector 52 monitors for a cue gesture for each monitoring region specified by the region specification data out of the image represented by the image signal V, but does not monitor for a cue gesture in those regions other than the monitoring regions. By use of the above configuration, it is possible to appropriately detect a cue gesture even in a case where a performer P who performs a cue gesture changes with the progression of the music being played.

(3) In the above embodiments, multiple image capturers 222 are used to capture the images of the multiple performers P. Alternatively, a single image capturer 222 can capture the image of the multiple performers P (e.g., the whole region of a stage where the multiple performers P are present). Likewise, a single sound receiver 224 can be used to receive sounds played by the multiple performers P. Furthermore, the cue detector 52 can monitor for a presence or absence of a cue gesture for each of the image signals V0 (hence, the image synthesizer 522 can be omitted).

(4) In the above-described embodiments, a cue gesture is detected by analyzing the image signal V captured by the image capturer 222. However, a method of detection of a cue gesture by the cue detector 52 is not limited to the above example. For example, the cue detector 52 can detect a cue gesture by a performer P by analyzing a detection signal of detection equipment (e.g., various types of sensors such as acceleration censors) mounted on the body of the performer P. The configuration of detecting a cue gesture by analyzing an image captured by the image capturer 222 as described in the above embodiment has an advantage that a cue gesture can be detected while reducing any adverse effects on a performer's playing movements as compared to a case of mounting detection equipment on the body of the performer P.

(5) In the above embodiment, the playback position T and the playback speed R are estimated by analyzing an audio signal A obtained by mixing audio signals A0, each representative of a sound of each of different musical instruments. However, each audio signal A0 can be analyzed to estimate the playback position T and playback speed R. For example, the performance analyzer 54 estimates a tentative playback position T and playback speed R for each of the audio signals A0 by way of substantially the same method as that in the above-described embodiment, and then determines a final playback position T and playback speed R from estimation results on the audio signals A0. For example, a representative value (e.g., average value) of the playback positions T and that of the playback speeds R estimated from the audio signals A0 can be calculated as the final playback position T and playback speed R. As will be understood from the foregoing description, the audio mixer 542 of the performance analyzer 54 can be omitted.

(6) As described in the above embodiments, the automatic player system 100 is realized by the control device 12 and a program working in coordination with each other. A program according to an aspect of the present disclosure causes a computer to function as: a cue detector 52 that detects a cue gesture of a performer P who plays a piece of music for playback; an performance analyzer 54 that sequentially estimates playback positions T in the piece for playback by analyzing, in conjunction with the performance, an audio signal representative of the played sound; and a playback controller 56 that causes an automatic player apparatus 24 to execute automatic playback of the piece for playback synchronous with the cue gesture detected by the cue detector 52 and with the progression of the playback position T estimated by the performance analyzer 54; and a display controller 58 that causes a display device 26 to display a playback image G representative of the progress of automatic playback. Thus, a program according to an aspect of the present disclosure is a program for causing a computer to execute a music data processing method. The program described above can be provided in a form stored in a computer-readable recording medium, and be installed on a computer. For instance, the storage medium can be a non-transitory storage medium, an example of which is an optical storage medium, such as a CD-ROM (optical disc), and can also be a freely-selected form of well-known storage media, such as a semiconductor storage medium and a magnetic storage medium. The program can be distributed to a computer via a communication network.

(7) An aspect of the present disclosure can be an operation method (automatic playback method) of the automatic player system 100 illustrated in each of the above described embodiments. For example, in an automatic playback method according to an aspect of the present disclosure, a computer system (a single computer, or a system consisting of multiple computers) detects a cue gesture of a performer P who plays a piece for playback (SA1), sequentially estimates playback positions T in the piece for playback by analyzing in conjunction with the performance an audio signal A representative of a played sound (SA2), causes an automatic player apparatus 24 to execute automatic playback of the piece for playback synchronous with the cue gesture and the progression of the playback position T (SA3), and causes a display device 26 to display a playback image G representative of the progress of automatic playback (SA4).

(8) Following are examples of configurations derived from the above embodiments.

Aspect A1

A performance analysis method according to an aspect of the present disclosure (Aspect A1) includes: detecting a cue gesture of a performer who plays a piece of music; calculating a distribution of likelihood of observation by analyzing an audio signal representative of a sound of the piece of music being played, where the likelihood of observation is an index showing a correspondence probability of a time point within the piece of music to a playback position; and estimating the playback position depending on the distribution of the likelihood of observation, and where calculating the distribution of the likelihood of observation includes decreasing the likelihood of observation during a period prior to a reference point specified on a time axis for the piece of music in a case where the cue gesture is detected. In the above aspect, cue gesture detection results are taken into account when estimating a playback position, in addition to the analysis results of an audio signal. As a result, playback positions can be highly accurately estimated compared to a case where only the analysis results of the audio signal are considered.

Aspect A2

A performance analysis method according to an aspect A2 is the performance analysis method according to the aspect A1. Calculating the distribution of the likelihood of observation includes: calculating from the audio signal a first likelihood value, which is an index showing a correspondence probability of a time point within the piece of music to a playback position; calculating a second likelihood value which is set to a first value in a state where no cue gesture is detected, or to a second value that is lower than the first value in a case where the cue gesture is detected; and calculating the likelihood of observation by multiplying together the first likelihood value and the second likelihood value. This aspect has an advantage in that the likelihood of observation can be calculated in a simple and easy manner by multiplying together a first likelihood value calculated from an audio signal and a second likelihood value dependent on a detection result of a cue gesture.

Aspect A3

A performance analysis method according to an aspect A3 is the performance analysis method according to the aspect A2. The first value is 1, and the second value is 0. According to this aspect, the likelihood of observation can be clearly distinguished between a case where a cue gesture is detected and a case where it is not.

Aspect A4

An automatic playback method according to an aspect of the present disclosure (Aspect A4) includes: detecting a cue gesture of a performer who plays a piece of music, estimating playback positions in the piece of music by analyzing an audio signal representative of a sound of the piece of music being played; and causing an automatic player apparatus to execute automatic playback of the piece of music synchronous with the detected cue gesture and with progression of the playback positions. Estimating each playback position includes: calculating a distribution of likelihood of observation by analyzing the audio signal, where the likelihood of observation is an index showing a correspondence probability of a time point within the piece of music to a playback position and estimating the playback position depending on the distribution of the likelihood of observation. Calculating the distribution of the likelihood of observation includes decreasing the likelihood of observation during a period prior to a reference point specified on a time axis for the piece of music in a case where the cue gesture is detected. In the above aspect, cue gesture detection results are taken into account when estimating a playback position in addition to the analysis results of an audio signal. Therefore, playback positions can be highly accurately estimated compared to a case where only the analysis results of the audio signal are considered.

Aspect A5

An automatic playback method according to an aspect A5 is the automatic playback method according to the aspect A4. Calculating the distribution of the likelihood of observation includes: calculating from the audio signal a first likelihood value, which is an index showing a correspondence probability of a time point within the piece of music to a playback position; calculating a second likelihood value which is set to a first value in a state where no cue gesture is detected, or to a second value that is below the first value in a case where the cue gesture is detected; and calculating the likelihood of observation by multiplying together the first likelihood value and the second likelihood value. This aspect has an advantage in that the likelihood of observation can be calculated in a simple and easy manner by multiplying together a first likelihood value calculated from an audio signal and a second likelihood value dependent on a detection result of a cue gesture.

Aspect A6

An automatic playback method according to an aspect A6 is the automatic playback method according to the aspect A4 or the aspect A5. The automatic player apparatus is caused to execute automatic playback in accordance with music data representative of content of playback of the piece of music, where the reference point is specified by the music data. Since each reference point is specified by music data indicating automatic playback to the automatic player apparatus, this aspect has an advantage in that the configuration and processing are simplified compared to a configuration in which plural reference points are specified separately from the music data.

Aspect A7

An automatic playback method according to an aspect A7 is the automatic playback method according to any one of the aspect A4 to the aspect A6. The display device is caused to display an image representative of progress of the automatic playback. According to this aspect, a performer is able to visually perceive the progress of the automatic playback by the automatic player apparatus and incorporate this knowledge into his/her performance. Thus, a natural sounding musical performance is realized in which the performance by the performers and the automatic playback by the automatic player apparatus interact with each other.

Aspect A8

An automatic player system according to an aspect of the present disclosure (Aspect A8) includes: a cue detector configured to detect a cue gesture of a performer who plays a piece of music; an analysis processor configured to estimate playback positions in the piece of music by analyzing an audio signal representative of a sound of the piece of music being played; and a playback controller configured to cause an automatic player apparatus to execute automatic playback of the piece of music synchronous with the cue gesture detected by the cue detector and with progression of the playback positions estimated by the analysis processor, and the analysis processor includes: a likelihood calculator configured to calculate a distribution of likelihood of observation by analyzing the audio signal, where the likelihood of observation is an index showing a correspondence probability of a time point within the piece of music to a playback position; and a position estimator configured to estimate the playback position depending on the distribution of the likelihood of observation, and the likelihood calculator decreases the likelihood of observation during a period prior to a reference point specified on a time axis for the piece of music in a case where the cue gesture is detected. In the above aspect, cue gesture detection results are taken into account in estimating a playback position in addition to the analysis results of an audio signal. Therefore, playback positions can be highly accurately estimated compared to a case where only the analysis results of the audio signal are considered.

(9) Following are examples of configurations derived from the above embodiments for the automatic player system.

Aspect B1

An automatic player system according to an aspect of the present disclosure (Aspect B1) includes: a cue detector configured to detect a cue gesture of a performer who plays a piece of music; a performance analyzer configured to sequentially estimate playback positions in a piece of music by analyzing, in conjunction with the performance, an audio signal representative of a played sound; a playback controller configured to cause an automatic player apparatus to execute automatic playback of the piece of music synchronous with the cue gesture detected by the cue detector and with progression of the playback positions detected by the performance analyzer; and a display controller that causes a display device to display an image representative of progress of the automatic playback. In this aspect, the automatic playback by the automatic player apparatus is performed such that the automatic playback synchronizes to cue gestures by performers and to the progression of playback positions, while a playback image representative of the progress of the automatic playback is displayed on a display device. According to this aspect, a performer is able to visually perceive the progress of the automatic playback by the automatic player apparatus and incorporate this knowledge into his/her performance. Thus, a natural sounding musical performance is realized in which the performance by the performers and the automatic playback by the automatic player apparatus interact with each other.

Aspect B2

An automatic player system according to an aspect B2 is the automatic playback method according to the aspect B1. The playback controller instructs the automatic player apparatus to play a time point that is ahead of each playback position estimated by the performance analyzer. In this aspect, the content of playback corresponding to a time point that is temporally ahead of a playback position estimated by the performance analyzer is indicated to the automatic player apparatus. Thus, the playing by the performers and the automatic playback can be highly accurately synchronized even in a case where the actual output of the sound by the automatic player apparatus lags relative to the playback instruction by the playback controller.

Aspect B3

An automatic player system according to an aspect B3 is the automatic playback method according to the aspect B2. The performance analyzer estimates a playback speed by analyzing the audio signal, and the playback controller instructs the automatic player apparatus to perform a playback of a position that is ahead of a playback position estimated by the performance analyzer by an adjustment amount that varies depending on the playback speed. In this aspect, the automatic player apparatus is instructed to perform a playback of a position that is ahead of a playback position by the adjustment amount that varies depending on the playback speed estimated by the performance analyzer. Therefore, even in a case where the playback speed fluctuates, the playing by the performer and the automatic playback can be synchronized highly accurately.

Aspect B4

An automatic player system according to an aspect B4 is the automatic playback method according to any one of the aspect B1 to the aspect B3. The cue detector detects the cue gesture by analyzing an image of the performer captured by an image capturer. In this aspect, a cue gesture is detected by analyzing an image of a performer captured by an image capturer. This aspect has an advantage in that a cue gesture can be detected while reducing the adverse effects on the performer's playing movements compared to a case of mounting detection equipment on a body of a performer.

Aspect B5

An automatic player system according to an aspect B5 is the automatic playback method according to any one of the aspect B1 to the aspect B4. The display controller causes the display device to display an image that dynamically changes depending on an automatic playback content. Since an image that dynamically changes depending on the automatic playback content is displayed on a display device, this aspect has an advantage in that a performer is able to visually and intuitively perceive the progress of the automatic playback.

Aspect B6

An automatic playback method according to an aspect of the present disclosure (Aspect B6) detects a cue gesture of a performer who plays a piece of music; sequentially estimates playback positions in a piece of music by analyzing, in conjunction with the performance, an audio signal representative of a played sound; causes an automatic player apparatus to execute automatic playback of the piece of music synchronous with the cue gesture and with progression of the playback positions; and causes a display device to display an image representative of the progress of the automatic playback.

DETAILED DESCRIPTION

Preferred embodiments of the present disclosure can be expressed as in the following.

1. Introduction

An automatic musical player system is a system in which a machine generates accompaniment by coordinating timing with human performances. In this description, there is discussed an automatic musical player system to which music score expression such as that which appears in classical music is supplied. In such music, different music scores are to be played respectively by the automatic musical player system and by one or more human performers. Such an automatic musical player system can be applied to a wide variety of performance situations; for example, as a practice aid for musical performance, or in extended musical expression where electronic components are driven in synchronization with a human performer. In the following, a part played by a musical ensemble engine is referred to as an "accompaniment part". The timings for the accompaniment part must be accurately controlled in order to realize a musical ensemble that is well-aligned musically. The following four requirements are involved in the proper timing control.

Requirement 1

As a general rule, the automatic musical player system must play at a position currently being played by a human performer. Thus, the automatic musical player system must align its playback position within a piece of music with the position being played by the human performer. In view of the fact that an ebb and flow in a performance tempo is an element crucial to musical expression, particularly in classical music, the automatic musical player system must track tempo changes in the human playing. Furthermore, to realize highly precise tracking, it is preferable to study the tendency of the human performer by analyzing the practice (rehearsal) thereof.

Requirement 2

The automatic musical player system must play in a manner that is musically aligned. That is, the automatic musical player system must track a human performance to an extent that the musicality of the accompaniment part is retained.

Requirement 3

The automatic musical player system must be able to modify a degree in which the accompaniment part synchronizes to the human performer (lead-follow relation) depending on a context of a piece of music. A piece of music contains a portion where the automatic musical player system should synchronize to a human performer even if musicality is more or less undermined, or a portion where it should retain the musicality of the accompaniment part even if the synchronicity is undermined. Thus, the balance between the "synchronicity" described in Requirement 1 and the "musicality" described in Requirement 2 varies depending on the context of a piece of music. For example, a part having unclear rhythms tends to follow a part having clearer rhythms.

Requirement 4

The automatic musical player system must be able to modify the lead-follow relation instantaneously in response to an instruction by a human performer. Human musicians often coordinate with each other through interactions during rehearsals to adjust a tradeoff between synchronicity and the musicality of the automatic musical player system. When such an adjustment is made, the adjusted portion is played again to ensure realization of the adjustment results. Accordingly, there is a need for an automatic musical player system that is capable of setting patterns of synchronicity during rehearsals.

Satisfying these requirements at the same time requires the automatic musical player system to generate an accompaniment part so that the music is not spoiled while tracking positions of the performance by the human performer. In order to achieve such requirements, the automatic musical player system must have three elements: namely, (1) a position prediction model for the human performer; (2) a timing generation model for generating an accompaniment part in which musicality is retained; and (3) a model that corrects a timing to play with consideration to a lead-follow relation. These elements must be able to be independently controlled or learned. However, in the conventional technique it is difficult to treat these elements independently. Accordingly, in the following description, we will consider independently modeling and then integrating three elements: (1) a timing generation process for the human performer to play; (2) a process of generating a timing for playback that expresses an extent within which an automatic musical player system can play a piece of music while retaining musicality; and (3) a process of coupling a timing for the automatic musical player system to play and a timing for the human performer to play in such a way in which the automatic musical player system follows the human performer while retaining a lead-follow relation. Independent expression of each element enables independent learning and control of individual elements. When the system is used, the system infers a timing for the human performer to play, and at the same time infers a range of timing within which the automatic musical player system can play, and plays an accompaniment part such that the timing of the musical ensemble is in coordination with the performance of a human performer. As a result, the automatic musical player system will be able to play with a musical ensemble, and avoid failing musically in following a human musician.

2. Related Work

In a conventional automatic musical player system, score following is used to estimate a timing for playing by a human performer. To realize coordination between a musical ensemble engine and human musicians over the score following, roughly two approaches are used. As a first approach, there has been proposed regression of an association between a timing for playing by a human performer and that for the musical ensemble engine to play through a large number of rehearsals, to learn average behaviors or every-changing behaviors in a given piece of music. With such an approach, the results of musical ensembles are regressed, and as a result, it is possible to achieve musicality of an accompaniment part and synchronous playing at the same. Meanwhile, it is difficult to separately express a timing prediction process for a human performer, a process of generating a playback timing by a musical ensemble engine, and an extent to which the engine should synchronize to the human performer, and hence it is difficult to independently control synchronous playing or musicality during rehearsals. Moreover, musical ensemble data between human musicians must additionally be analyzed in order to achieve synchronous playing. Preparing and maintaining content to this end is costly. The second approach provides restrictions on temporal trajectory by using a dynamic system written using a small number of parameters. In this approach, with prior information such as tempo continuity being provided, the system learns the temporal trajectory and so on for the human performer through rehearsals. The system can also learn the onset timing of an accompaniment part separately. Since the temporal trajectory is written with a small number of parameters, it is possible for a human operator to manually and easily override the "tendency" of the accompaniment part or of a human musician during a rehearsal. However, it is difficult to independently control synchronous playing, and hence synchronous playing is indirectly derived from differences in onset timing when the human performer and the musical ensemble engine perform independently. In order to enhance an ability for instantaneous response during rehearsals, it is considered that alternately performing learning by the automatic musical player system and interaction between the automatic musical player system and a human performer is effective. Accordingly, there has been proposed a method for adjusting an automatic playback logic in order to independently control synchronous playing. In this proposal, there is discussed a mathematical model that enables independent control of "the synchronicity (how it is achieved)", "timing for an accompaniment part to play", and "timing for a human performer to play" through interactions based on the above ideas.

3. System Overview

Figure 12:
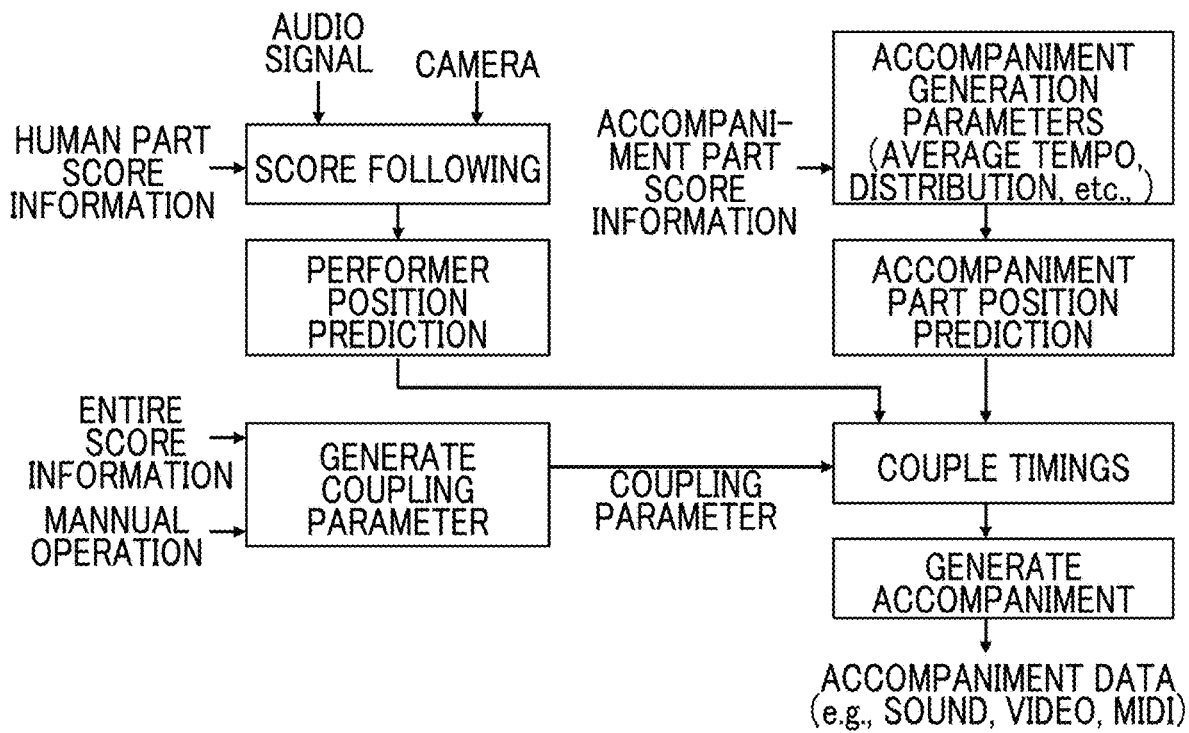
FIG. 12 is a block diagram showing an automatic player system.

FIG. 12 shows a configuration of an automatic musical player system. In this proposal, score following is performed based on audio signals and camera images, to track the position of a human performance. Furthermore, statistical information derived from the posterior distribution of the music score following is used to predict the position of a human performance. This prediction follows the generation process of positions at which the human performer is playing. To determine an onset timing of an accompaniment part, an accompaniment part timing is generated by coupling the human performer timing prediction model and the generation process of timing at which the accompaniment part is allowed to play.

4. Score Following

Score following is used to estimate a position in a given piece of music at which a human performer is currently playing. In the score following technique of this system, a discrete state space model is considered that expresses the position in the score and the tempo of the performance at the same time. Observed sound is modeled in the form of a hidden Markov process on a state space (hidden Markov model; HMM), and the posterior distribution of the state space is estimated sequentially with a delayed-decision-type forward-backward algorithm. The delayed-decision-type forward-backward algorithm refers to calculating posterior distribution with respect to a state of several frames before the current time by sequentially executing the forward algorithm, and running the backward algorithm by treating the current time as the end of data. Laplace approximation of the posterior distribution is output when a time point inferred as an onset in the music score has arrived, where the time point is inferred as an onset on the basis of the MAP value of the posterior distribution.

Next discussed is the structure of a state space. First, a piece of music is divided into R segments, and each segment is treated as consisting of a single state. The r-th segment has n number of frames, and also has for each n the currently passing frame $0 \leq l < n$ as a state variable. Thus, n corresponds to a tempo within a given segment, and the combination of r and l corresponds to a position in a music score. Such a transition in a state space is expressed in the form of a Markov process such as follows:

(1) from $(r, n, l)$ to itself : $p$ (2) from $(r, n, l < n)$ to $(r, n, l+1) : 1 - p$ (3) from $(r, n, n-1)$ to $(r+1, n', 0) : (1-p)\frac{1}{2\lambda^{(T)}}e^{-\lambda^{(T)}|n'-n|}$.

Such a model possesses the characters of both of the explicit-duration HMM and the left-to-right HMM. This means the selection of n enables the system to decide an approximate duration within a segment, and thus the self transition probability p can absorb subtle variations in tempo within the segment. The length of the segment or the self transition probability is obtained by analyzing the music data. Specifically, the system uses tempo indications or annotation information such as fermata.

Next is defined a likelihood of observation in such a model. Each state (r, n, l) corresponds to a position ~s (r, n, l) within a piece of music. Assigned to a position s in the piece of music are the average values $/\sim c_s^2$ and $/\Delta \sim c_s^2$ of the observed constant Q transform (CQT) and ΔCQT, and the accuracy degrees $\kappa_s^{(c)}$ and $\kappa_s^{(\Delta c)}$ (the symbol "/" means vector and the symbol "~" means an overline in equations). When CQT, $c_t$, ΔCQT, and $\Delta c_t$ are observed at time t based on the above, the likelihood of observing a state $(r_t, n_t, l_t)$ is expressed as follows:

$$p(c_t, \Delta c_t | (r_t, n_t, l_t), \lambda, \{\overline{c}_s\}_{s=1}^S, \{\Delta \overline{c}_s\}_{s=1}^S) = \quad (1)$$
$$vMF(c_t | \overline{c}_{s(r_t,n_t,l_t)}, \kappa_{s(r_t,n_t,l_t)}^{(c)}) \times vMF(\Delta c_t | \Delta \overline{c}_{s(r_t,n_t,l_t)}, \kappa_{s(r_t,n_t,l_t)}^{(c)}).$$

Here, vMF $(x|\mu,\kappa)$ represents von Mises-Fisher distribution. Specifically, vMF $(x|\mu,\kappa)$ is expressed as follows by normalizing x so as to fulfill $x \in S^D$ ($S^D$: D−1 dimensional unit sphere surface).

$$vMF(x|\mu,\kappa) \propto \frac{\kappa^{D/2-1}}{I_{D/2-1}(\kappa)} \exp(\kappa \mu' x)$$

The system uses a piano roll consisting of a music score expression and a CQT model assumed from each sound, to decide the values of ~c or Δ~c. The system first assigns a unique index i to a pair of pitches existing in the music score and played by an instrument. The system also assigns an average observation $CQT\omega_{i,f}$ to the i-th sound. If $h_{s,i}$ is the loudness of the i-th sound at a position s in the music score, $\sim c_{s,f}$ is given as follows:

$$\overline{c}_{s,f} = \sum_i h_{s,i} \omega_{i,f}.$$

Δ~c is obtained by taking first order difference of $\sim c_{s,f}$ in the s direction and half-wave rectifying it.

When starting a piece of music from no sound, the visual information is critical. The system therefore uses cue gestures (cueing) detected from a camera placed in front of a human performer. Unlike an approach employing the top-down control of the automatic musical player system, a cue gesture (either its presence or absence) is directly reflected in the likelihood of observation. Thus, audio signals and cue gestures are treated integrally. The system first extracts positions $\{\hat{q}_i\}$ where cue gestures are required in the music score information. $\hat{q}_i$ includes the start timing of a piece of music and fermata position. If the system detects a cue gesture during the score following, the system sets the likelihood of observing a state corresponding to a position U[$\hat{q}_i$−τ, $\hat{q}_i$] in the music score to zero. This leads posterior distribution to avoid positions before the positions corresponding to cue gestures. The musical ensemble engine receives, from the score follower and at a point that is several frames after a position where a note switches to a new note in the music score, a normal distribution approximating an estimated current position or tempo distribution. Upon detecting the switch to the n-th note (hereafter, "onset event") in the music data, the music score follower engine reports, to a musical ensemble timing generator, the time stamp $t_n$ indicating a time at which the onset event is detected, an estimated average position, $\mu_n$ in the music score, and its variance $\sigma_n^2$. Employing the delayed-decision-type estimation causes a 100-ms delay in the reporting itself.

5. Coupled Timing Model

The musical ensemble engine calculates a proper playback position of the musical ensemble engine based on information $(t_n, \mu_n, \sigma_n^2)$ reported from the score follower. In order for the musical ensemble engine to synchronize to the human performer, it is preferable to independently model three processes: (1) a generation process of timings for the human performer to play; (2) a generation process of timings for the accompaniment part to play; and (3) a performance process for the accompaniment part to play while listening to the human performer. With these models, the system generates the ultimate timings at which the accompaniment part wants to play, considering the desired timing for the accompaniment part to play and the predicted positions of the human performer.

5.1 Timing Generation Process For Human Performance

To express timings at which human performers play, it is assumed that a position in a music score at which the human plays moves between $t_n$ and $t_{n+1}$ at a constant velocity $v_n^{(p)}$. That is, given $x_n^{(p)}$ being the position in a music score the human performer is playing at $t_n$, and given $\varepsilon_n^{(p)}$ being the noise with respect to the velocity or the position in the music score, a generation process is considered as follows. Here, we let $\Delta T_{m,n} = t_m - t_n$.

$$x_n^{(p)} = x_{n-1}^{(p)} + \Delta T_{n,n-1} v_{n-1}^{(p)} + \varepsilon_{n,0}^{(p)}$$

$$v_n^{(p)} = v_{n-1}^{(p)} + \varepsilon_{n,1}^{(p)}$$

The noise $\varepsilon_n^{(p)}$ includes Agogik or onset timing errors in addition to tempo changes. To express Agogik, we consider a transition model from $t_n$ to $t_{n-1}$, at an acceleration generated from the normal distribution of variance $\psi^2$, considering that the onset timing varies depending on the changes in tempo. Then, assuming that the covariance matrix of $\varepsilon_n^{(p)}$ is h=$[\Delta T_{n,n-1}^2/2, \Delta T_{n,n-1}]$, $\Sigma_n^{(p)} = \psi^2$h'h is given, and tempo changes are associated with onset timing changes as a result. To express the onset timing errors, the white noise for the standard deviation $\sigma_n^{(p)}$ is considered, and $\sigma_n^{(p)}$ is added to $\Sigma_{n,0,0}^{(p)}$. Accordingly, given that the matrix generated by adding $\sigma_n^{(p)}$ to $\Sigma_{n,0,0}^{(p)}$ is $\Sigma_n^{(p)}$, $\varepsilon_n^{(p)} \sim N(0,\Sigma_n^{(p)})$ is derived. N(a, b) means the normal distribution of the average a and variance b.

Next, we consider coupling the timing history of user performance $/\mu_n = [\mu_n, \mu_{n-1}, \ldots, \mu_{n-In}]$ and $/\sigma_n^2 = [\sigma_n, \sigma_{n-1}, \ldots, \sigma_{n-In}]$, reported by the score following system, with Equation (3) or Equation (4). Here, $I_n$ is the length of history considered, and is set such that all note events that have occurred one beat before $t_n$ are contained. We define the generation process of such $/\mu_n$ or $/\sigma_n^2$ as follows:

$$\mu_n \sim \mathcal{N}(W_n[x_n^{(p)} v_n^{(p)}], \text{diag}(\sigma_n^2))$$

$$\mathcal{N}(x|\mu, \Sigma) = \frac{1}{2\sqrt{|\Sigma|}} \exp\left(-\frac{1}{2}(x-\mu)'\Sigma^{-1}(x-\mu)\right).$$

Here, $/W_n$ is regression coefficients to predict observation $/\mu_n$ from $x_n^{(p)}$ and $v_n^{(p)}$). Here, we define $/W_n$ as follows:

$$W_n^T = \begin{pmatrix} 1 & 1 & \cdots & 1 \\ \Delta T_{n,n} & \Delta T_{n,n-1} & \cdots & \Delta T_{n,n-l_n+1} \end{pmatrix}. \quad (6)$$

Unlike the conventional method in which there is used a most recent observation value $\mu_n$, the present method additionally uses the prior history. Consequently, even if the score following fails only partially, the operation overall is less likely to fail. Furthermore, we consider that $/W_n$ can be obtained throughout rehearsals, and in this way, the score follower will be able to track performance that depends on a long-term tendency, such as patterns of increase and decrease of tempo. Such a model corresponds to the concept of trajectory HMM being applied to a continuous state space in a sense that the relation between the tempo and the score position changes is clarified.

5.2 Timing Generation Process for Accompaniment Part Playback

Using the above-described timing model for a human performer enables the inference of the internal state $[x_n^{(p)}, v_n^{(p)}]$ of the human performer from the position history reported by the score follower. The automatic musical player system coordinates such an inference and a tendency indicative of how the accompaniment part "wants to play", and then infers the ultimate onset timing. Next is considered the generation process of the timing for the accompaniment part to play. Here, the timing for the accompaniment part to play concerns how the accompaniment part "wants to play".

Regarding the timing for the accompaniment part to play, we consider a process in which the accompaniment part plays at a temporal trajectory that is within a certain range of a given temporal trajectory. Used as the given temporal trajectory can be a performance rendering system or human performance data. The predicted value of a current score position within a piece of music, $\hat{x}_n^{(a)}$, as of when the automatic musical player system receives the n-th onset event, and its relative velocity $\hat{v}_n^{(a)}$ are given as follows:

$$\hat{x}_n^{(a)} = x_{n-1}^{(a)} + \Delta T_{n,n-1} v_{n-1}^{(a)} + \epsilon_{n,0}^{(a)} \qquad (7)$$

$$\hat{v}_n^{(a)} = \beta v_{n-1}^{(a)} + (1-\beta)\tilde{v}_n^{(a)} + \epsilon_{n,1}^{(a)} \qquad (8).$$

Here, $\sim v_n^{(a)}$ is a tempo given in advance at a score position n reported at time $t_n$, and there assigned a temporal trajectory given in advance. $\epsilon^{(a)}$ defines a range of allowable deviation from a timing for playback generated based on the temporal trajectory given in advance. With such parameters, the range of performance that sounds musically natural as an accompaniment part is decided. $\beta \in [0, 1]$ is a parameter that expresses how strongly it tries to revert to the tempo given in advance, and causes the temporal trajectory to revert to $\sim v_n^{(a)}$. Such a model has particular effects on audio alignment. Accordingly, it is suggested that the method is feasible as a generation process of timing for playing the same piece of music. It is of note that when there is no such restriction ($\beta=1$), $\hat{v}$ follows the Wiener process, and in that case, the tempo might diverge, possibly causing generation of extremely fast or slow playback.

5.3 Coupling Process of Timing for Human Performance and Timing for Accompaniment Part Playback The preceding sections describe modeling an onset timing of a human performer and that of an accompaniment part separately and independently. In this section, there is described, with the above described generation processes in mind, a process of the accompaniment part synchronizing to the human playing while listening thereto. Accordingly, when the accompaniment part synchronizes to humans, we consider expressing a behavior of gradual correction of an error between a predicted value of a position that the accompaniment part is now going to play and the predicted value of the current position of the human playing. Hereafter, a variable that describes a strength of correction of such an error is referred to as a "coupling parameter". The coupling parameter is affected by the lead-follow relation between the accompaniment part and the human performer. For example, when the human performer is playing a more defined rhythm than the accompaniment part, the accompaniment part tends to synchronize more closely to the human playing. Furthermore, when an instruction is given on the lead-follow relation from the human performer during rehearsals, the accompaniment part must change the degree of synchronous playing to that instructed. Thus, the coupling parameter depends on the context in a piece of music or on the interaction with the human performer. Accordingly, given the coupling parameter $\gamma_n \in [0, 1]$ at a score position as of receiving $t_n$, the process of the accompaniment part synchronizing to the human playing is given as follows:

$$x_n^{(a)} = \hat{x}_n^{(a)} + \gamma_n(x_n^{(p)} - \hat{x}_n^{(a)}) \qquad (9)$$

$$v_n^{(a)} = \hat{v}_n^{(a)} + \gamma_n(v_n^{(p)} - \hat{v}_n^{(a)}) \qquad (10).$$

In this model, the degree of following depends on the amount of $\gamma_n$. For example, the accompaniment part completely ignores the human performers when $\gamma_n=0$, and the accompaniment part tries to perfectly synchronize with the human performers when $\gamma_n=1$. In this type of model, the variance of the performance $\hat{x}_n^{(a)}$ which the accompaniment part can play and also the prediction error in the timing $x_n^{(p)}$ for the human playing are weighted by the coupling parameter. Accordingly, the variance of $x^{(a)}$ or that of $v^{(a)}$ is a resulting coordination of the timing stochastic process itself for the human playing and the timing stochastic process itself for the accompaniment part playback. Thus, the temporal trajectories that both the human performer and the automatic musical player system "want to generate" are naturally integrated.

Figure 13:
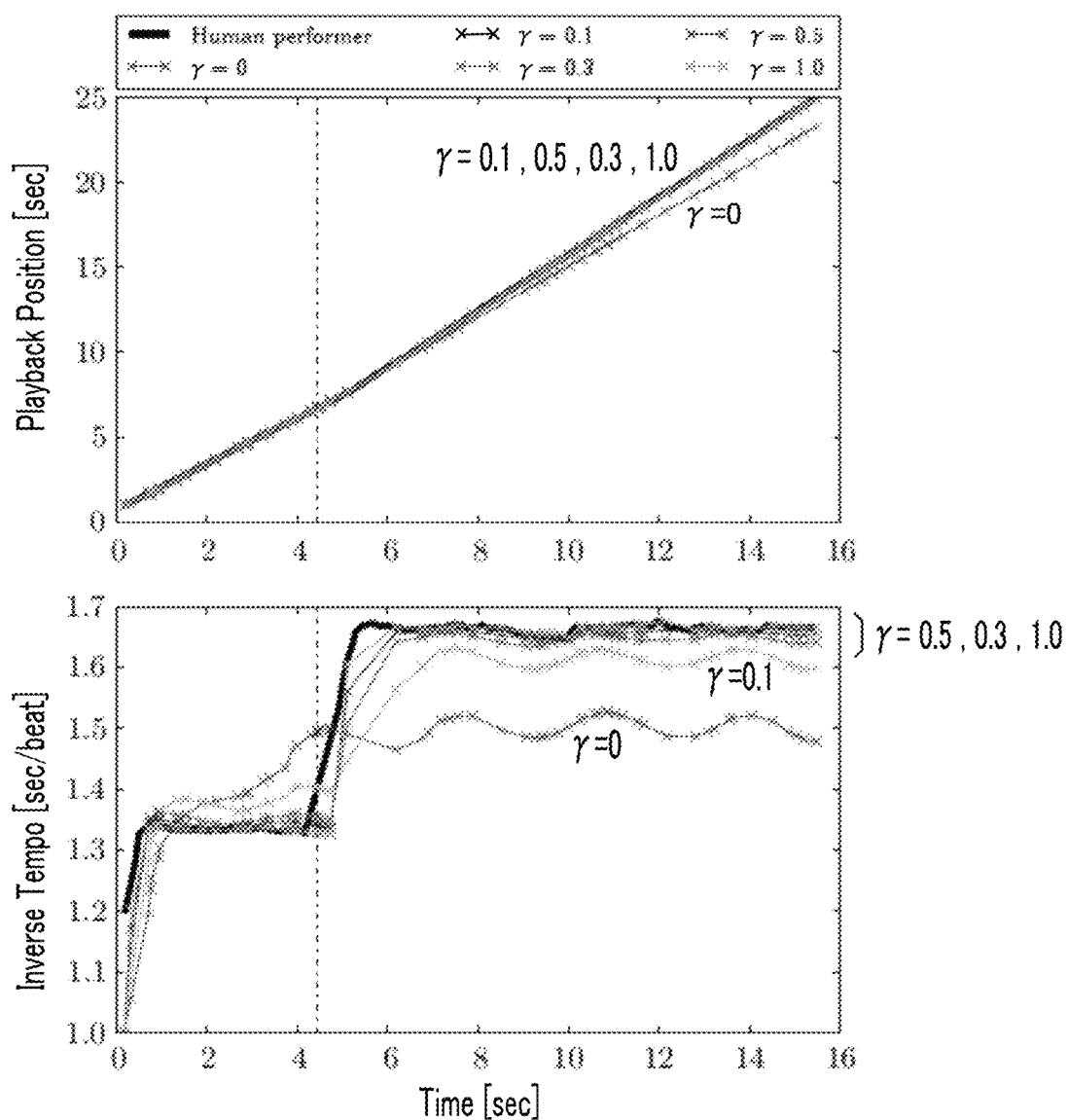
FIG. 13 shows simulated results of performer's sound output timing and sound output timing of an accompaniment part.

FIG. 13 shows simulated results of the present model, where $\beta=0.9$. It can be observed that by thus changing the value of $\gamma$, the differences between the temporal trajectory (sine wave) of the accompaniment part, and the temporal trajectory (step function) of the human performers can be supplemented. Furthermore, it can be observed that, due to the effect of $\beta$, the generated temporal trajectory is able to evolve such that the curve can move closer to the target temporal trajectory of the accompaniment part than the temporal trajectory of the human performers. Thus, the accompaniment part "pulls" the human performer when the tempo is faster than $\sim v^{(a)}$, while "pushing" the human performer when it is slower.

5.4 Method of Calculating Coupling Parameter $\gamma$

The degree of synchronous playing between performers such as that expressed as the coupling parameter $\gamma_n$ is set depending on several factors. First, the lead-follow relation is affected by a context in a piece of music. For example, the lead part of the musical ensemble is often one that plays relatively simple rhythms. Furthermore, the lead-follow relation sometimes changes through interaction. To set the lead-follow relation based on the context in a piece of music, we calculate, from the score information, the density of the note $\varphi_n=$[the moving average of the note density of the accompaniment part and the moving average of the note density of the human part]. We consider that, since for parts with more notes it is easier to decide the temporal trajectory, such characteristics can be used to extract the coupling parameter approximately. In this case, the behaviors such as follow are preferable: the position prediction of the musical ensemble is entirely governed by a human performer when the accompaniment part is not playing ($\varphi_{n,0}=0$), whereas the position prediction of the musical ensemble ignores human performers when the human performers are not playing ($\varphi_{n,1}=0$). Thus, $\gamma_n$ is decided as follows:

$$\gamma_n = \frac{\phi_{n,1} + \epsilon}{\phi_{n,1} + \phi_{n,0} + 2\epsilon}.$$

Here, $\epsilon>0$ is a sufficiently small value. In a musical ensemble consisting of human musicians, a one-side lead-follow relation ($\gamma_n=0$ or $\gamma_n=1$) is unlikely to occur. Likewise, with the heuristic such as in the above equation, a completely one-side lead-follow relation does not take place when both the human performer and the accompaniment part are playing. A completely one-side lead-follow relation occurs only when either the human playing or the musical ensemble engine is soundless, and this behavior is preferable.

$\gamma_n$ can be overwritten by a human performer or by a human operator during rehearsals, etc., where necessary. We consider that the following are preferable characters for a human to overwrite with an appropriate value during a rehearsal: the $\gamma_n$ range (boundaries) is limited, and the behaviors under the boundary conditions are obvious; or the behaviors continuously change in response to the changes in $\gamma_n$.

5.5 Online Inference

In the real-time application, the automatic musical player system updates the previously described posterior distribution of the timing model for playback when it receives ($t_n$, $\mu_n$, $\sigma_n^2$). In this proposal, Kalman filter is used to achieve effective inference. When ($t_n$, $\mu_n$, $\sigma_n^2$) is notified, the system performs the predict and the update steps of the Kalman filter to predict a position to be played by the accompaniment part at time t as follows:

$$x_n^{(a)} + (T^{(s)} + t - t_n) v_n^{(a)}.$$

Here, $\tau^{(s)}$ is the input-output latency of the automatic musical player system. This system updates state variables at the onset timing of the accompaniment part also. Thus, as described before, the system performs the predict/update steps depending on the score following results, and in addition, when the accompaniment part plays a new note, the system only performs the predict step to replace the state variables by the predicted value obtained.

6. Evaluation Experiment

To evaluate this system, we first evaluate the precision in the position estimation of the human playing. For the musical ensemble timing generation, we evaluate the effectiveness of $\beta$, which is a parameter that tries to revert the tempo of the musical ensemble to the default tempo, or the effectiveness of $\gamma$, which is an index of an extent to which the accompaniment part should synchronize to the human playing, by conducting informal interviews with the human performers.

6.1 Score Following Evaluation

To evaluate the score following precision, we evaluated the following precision for the Bergmuller Etudes. The evaluation dataset consisted of 14 recorded piano pieces (No. 1, No. 4-10, No. 14, No. 15, No. 19, No. 20, No. 22, No. 23) of Bergmuller Etudes (Op. 100) played by a pianist, and we evaluated the score following precision. No camera inputs were used in this experiment. We evaluated "Total Precision", which is modeled after evaluation measures used in MIREX. Total Precision indicates an overall precision rate of a whole corpus in a case where the alignment error under a threshold $\tau$ is treated as correct.

Figure 14:
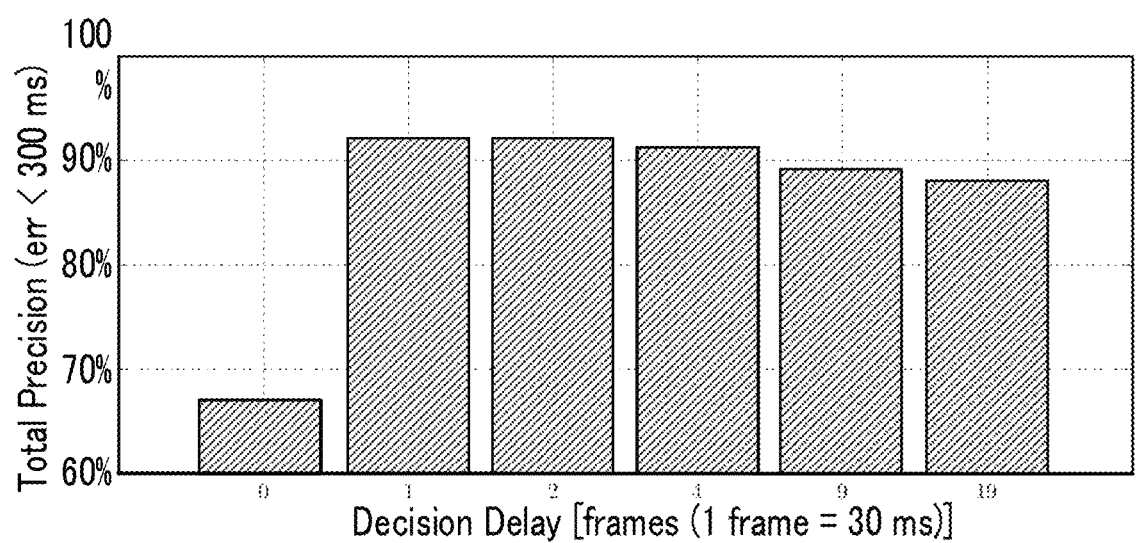
FIG. 14 shows evaluation results of the automatic player system.

To examine the effectiveness of the delayed-decision-type inference, we first evaluated Total Precision ($\tau=300$ ms) for a delayed frame amount in the delayed-decision forward backward algorithm. The results are shown in FIG. 14. The results show that utilizing the posterior distribution of a result from several frames before the current time improves precision. Furthermore, the results show that the delay of more than two frames gradually degrades precision. In a case where the delay consists of two frames, Total Precision is 82% given $\tau=100$ ms, and 64% given $\tau=50$ ms.

6.2 Coupled Timing Model Verification

The coupled timing model was verified by conducting informal interviews with human performers. This model is characterized by the parameter $\beta$ and the coupling parameter $\gamma$. $\beta$ shows the degree at which the musical ensemble engine tries to revert the human performer to the determined tempo. We verified the effectiveness of these two parameters.

First, to eliminate the effects of the coupling parameter, we prepared a system in which we let Equation (4) be $v_n^{(p)} = \beta v_{n-1}^{(p)} + (1-\beta) \hat{v}_n^{(a)}$, $x_n^{(a)} = x_n^{(p)}$, and $v_n^{(a)} = v_n^{(p)}$. This is a musical ensemble engine that directly uses filtered score following results for generating timing for the accompaniment to play while performing the filtering assuming that the expected value of the tempo is $\hat{v}$ and that the variance in the expected tempo is dynamically controlled by $\beta$. First, we asked six pianists to use the automatic musical player system with $\beta=0$ for one day, and then conducted informal interviews with them about playability. We chose pieces covering a wide variety of genres, such as classical, Romantic, and popular music. When interviewed, a majority of the pianists stated that the tempo became excessively slow or fast because when humans tried to synchronize to the accompaniment, the accompaniment part also tried to synchronize to the humans. Such a phenomenon arises where the system responses are not completely in synchronization with the human performers due to an improperly set $\tau^{(s)}$ in Equation (12). For example, in a case where the system response is slightly earlier than expected, the user increases the tempo in order to synchronize to the system that responded slightly earlier. As a result, the system that follows the increased tempo responds even earlier, and thus, the tempo keeps getting faster and faster.

Next, using the same piece of music but with $\beta=0.1$, five other pianists and one of the pianists who participated in the experiment using $\beta=0$ tested the system. Informal interviews asking the same questions as those we asked the participants for the case with $\beta=0$ were held, but the participants did not mention an issue of the tempo becoming progressively slower or faster. The pianist who participated in the test with $\beta=0$ also commented that synchronous playing was improved. Meanwhile, they commented that, when there was a huge difference between the tempo expected by the human performer for a given piece of music and the tempo to which the system attempted to revert the human playing, the system was slow in catching up or pushed the human performer. This tendency was particularly noticeable when an unknown piece was played, i.e., when the human performer did not know a "commonsense" tempo. It was suggested from the experiment that the function of the system that tries to revert the human playing to a certain tempo prevents the tempo from becoming extremely fast or slow before it occurs, whereas, in a case where a large discrepancy exists in the interpretations of the tempo between the human performer and the accompaniment part, the human performer has the sense of being pushed by the accompaniment part. It was also suggested that synchronous playing should be changed depending on a context of a piece of music. The participants made the same comments on the degree of synchronous playing, such as "it would be better if the human performer were guided" or "it would be better if the accompaniment synchronized to the human performer", depending on the character of a piece of music.

Finally, we asked a professional string quartet to use the system with fixed γ=0 and the system with variable γ adjusted depending on the context of performance. The quartet commented that the latter system was more usable. Thus, effectiveness of the latter system was suggested. However, the system must be further verified using the AB method or the like because the participants were informed prior to the test that the latter system was an improved system. Furthermore, there were some instances of changing γ based on interactions during rehearsals. Thus, it was also suggested that it would be effective to change the coupling parameter during rehearsals.

7. Pre-Learning Process

To obtain the "tendency" of the human playing, we estimate $h_{s,i}$, $\omega_{i,f}$ and the temporal trajectory based on a MAP state $\hat{s}_t$ at time t calculated from the score following results and the input feature sequence thereof $\{c_t\}_{t=1}^T$. We briefly discuss estimation methods thereof in the following. In estimating $h_{s,i}$ and $\omega_{i,f}$, we consider a Poisson-Gamma-system Informed NMF model as follows, to estimate posterior distribution:

$$c_{t,f} \sim \text{Poisson}\left(\sum_i^I h_{\hat{s}_t,i}\omega_{i,f}\right)$$

$$h_{s,i} \sim \text{Gamma}(a_0^{(h)}, b_{0,s,i}^{(h)})$$

$$\omega_{i,f} \sim \text{Gamma}(a_{i,f}^{(\omega)}, b_{i,f}^{(\omega)}).$$

The hyper parameters used here are calculated appropriately from an instrument sound database or a piano roll that represents a music score. The posterior distribution is approximately estimated with a variational Bayesian method. Specifically, the posterior distribution p (h, ω|c) is approximated in the form of q(h)q(w), and the KL distance between the posterior distribution and q(h)q(w) is minimized while introducing auxiliary variables. The MAP estimation of the parameter ω that corresponds to the timbre of an instrument sound, derived from the thus estimated posterior distribution, is stored, and is applied in subsequent real-time use of the system. It is of note that h corresponding to the intensity in the piano roll can be used.

The time length for the human performer to play each segment in a piece of music (i.e., temporal trajectory) is subsequently estimated. The estimation of the temporal trajectory enables the reproduction of the tempo expression particular to that performer, and therefore, the score position prediction for the human performer is improved. On the other hand, the temporal trajectory estimation could err due to estimation errors when the number of rehearsals is small, and as a result, the score position prediction precision could become degraded. Accordingly, we consider providing prior information on the temporal trajectory in advance and changing the temporal trajectory only for the segments where the temporal trajectory of the human performer keeps deviating from the prior information. The degree of variation in the tempo of the human playing is first calculated. Since the estimated value of the degree of variation also becomes unstable if the number of rehearsals is small, the temporal trajectory distribution for the human performer is also provided with the prior information. We assume that the average $\mu_s^{(P)}$ and the variance $\lambda_s^{(P)}$ of the tempo of the human playing at a position s in a piece of music is in accordance with $N(\mu_s^{(P)}|m_0,b_0\lambda_s^{(P)-1})$ Gamma($\lambda_s^{(P)-1}|a_0^\lambda,_0^\lambda$). Then, further assuming that the average of the tempo derived from K number of performances is $\mu_s^{(R)}$ and the precision (variance) thereof is $\lambda_s^{(R)-1}$, the posterior distribution of the tempo is given as follows:

$$q(\mu_s^{(P)}, \lambda_s^{(P)-1}) =$$

$$p(\mu_s^{(P)}, \lambda_s^{(P)-1} \mid M, \mu_s^{(R)}, \lambda_s^{(R)}) = N\left(\mu_s^{(P)} \left| \frac{b_0 m_0 + M\mu_s^{(R)}}{b_0 + M}, (b_0 + M)\lambda_s^{(P)-1}\right.\right) \times$$

$$\text{Gamma}\left(\lambda_s^{(P)} \left| a_0^\lambda + \frac{M}{2}, b_0^\lambda + \frac{1}{2}\left(M\lambda_s^{(R)-1} + \frac{Mb_0(\mu_s^{(R)} - m_0)^2}{M + b_0}\right)\right.\right).$$

The thus obtained posterior distribution is treated as that which is generated from distribution $N(\mu_s^S, \lambda_s^{S-1})$ of a tempo that could be taken at the position s, and the average value of the obtained posterior distribution as treated in the above manner will be given as follows:

$$\langle\mu_s^{(S)}\rangle_{p(\mu_s^{(S)}|\mu_s^{(P)},\lambda_s^{(P)},M)} = \frac{\langle\lambda_s^{(P)}\rangle\mu_s^{(S)} + \lambda_s^{(S)}\langle\mu_s^{(P)}\rangle}{\lambda_s^{(S)} + \langle\lambda_s^{(P)}\rangle}.$$

Thus calculated tempo is used for updating the average value of c used in Equation (3) or (4).

Third Embodiment

Description is now given of a third embodiment. In this embodiment, the automatic player system 100 plays a music while recognizing cue gestures of a human performer P. In each of the configurations described below, elements having substantially the same structures or functions as those in the first embodiment will be denoted by the same reference symbols as those used in the description of the first embodiment, and detailed description thereof will be omitted, as appropriate.

The cue gesture supposed in the present embodiment is a gesture performed, in particular by movement of the performer P's face. The cue gesture in the present embodiment expresses a timing at which an event is generated. The event in this embodiment corresponds to one of a variety of behaviors in playing music, and is a timing of starting or stopping sound production, tempo cycles, and others. The cue gesture in this embodiment is a combination of a first gesture and a second gesture. The first gesture is looking toward a person or persons to whom the cue is given. The second gesture is, for example, nodding. The second gesture may be producing back-channel feedback. The second gesture may be moving one's face upward such as when inhaling.

Figure 15:
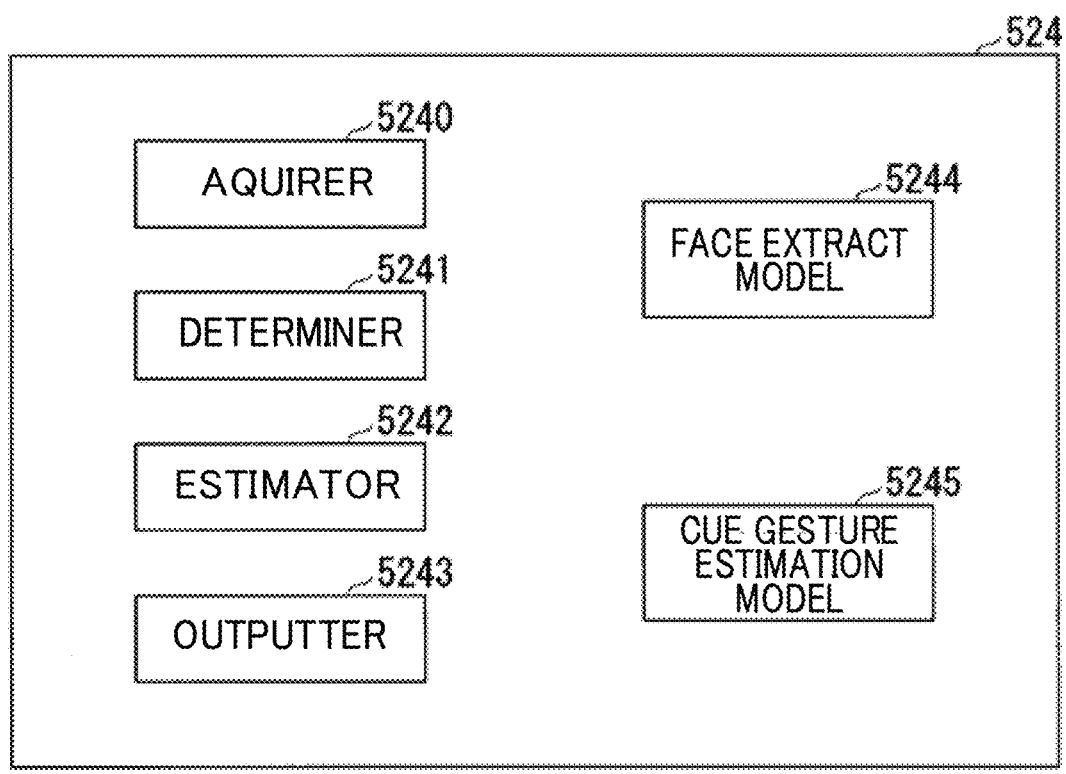
FIG. 15 is a block diagram of a detection processor 524 according to a third embodiment.

FIG. 15 is a block diagram showing an example configuration of a detection processor 524 according to the third embodiment. The detection processor 524 has an acquirer 5240, a determiner 5241, an estimator 5242, an outputter 5243, a face extract model 5244, and a cue gesture estimation model 5245, for example.

The acquirer 5240 acquires image information. The image information is obtained by capturing a performer P who is performing music, and includes an image signal V generated by the image synthesizer 522, for example.

In the present embodiment, the image information includes depth information, which is indicative of, for each pixel of the image, a distance from a predetermined position (e.g., capture position) to a position of an object of capture. In this case, the image capturers 222 of the recorder 22 include at least one depth camera. The depth camera is a distance sensor that senses a distance to the object to be captured. Such a distance sensor, for example, emits a beam of light, for example, light within the infra-red spectrum, to the object, so as to measure the distance to the object based on an amount of time it takes for the object-reflected light beam to return to and be received at the sensor. Alternatively, the image capturers 222 includes a stereo camera. The stereo camera captures images of the object from different directions, based on which a depth value for the object (depth information) is calculated.

The acquirer 5240 repeatedly acquires image information at predetermined intervals. The predetermined intervals may be freely set, and may be periodic, random, or a combination of each. The acquirer 5240 outputs the acquired image information to the determiner 5241.

The determiner 5241 extracts a face including human eyes within an image (hereafter, "captured image") indicated by the image information, based on the image information acquired from the acquirer 5240.

More specifically, the determiner 5241 first separates a background from the captured image. The determiner 5241 uses, for example, the depth information for each pixel to determine pixels for which a distance to the object is greater than a predetermined threshold; namely, to determine pixels that are a part corresponding to the background of the object image. The determiner 5241 then extracts a region corresponding to pixels for which the distances to the object are smaller than the predetermined threshold, thereby to separate away the background from the image. In this case, even if the distance to the object is smaller than the predetermined threshold in a given region, the determiner 5241 may determine that that region is background if an area of the region is smaller than a predetermined given threshold for the area.

The determiner 5241 extracts a face of the object, using the face extract model 5244 and an image obtained by separating away (separating and removing) the background. The face extract model 5244 is a learning model generated by causing the learning model to learn training data. The learning model is a convolutional neural network (CNN), for example. The training data is a data set in which images for learning, each of which is a captured image of a face including human eyes, are associated with a corresponding determination result for a human face in each image for learning. Through learning of the training data, the face extract model 5244 is trained as a model that estimates, from an input image, a human face of a person in the image, and outputs a result of the estimation. The determiner 5241 extracts a face based on the output obtained by inputting into the face extract model 5244 the image information obtained from the acquirer 5240.

The determiner 5241 then detects a motion of the face based on an image of the face (hereafter, "extracted image") extracted from the captured image. The determiner 5241 detects a motion of the face, for example by comparing sequential extracted images in order. The determiner 5241, for example, extracts a feature point from each extracted image, and tracks temporal changes in position coordinates of the extracted feature point, thereby to detect a motion of the face. The feature point is a point that indicates a characteristic point of a face, and is for example, an inner corner of the eye, an outer corner of the eye, or the like. In cases where the extracted image contains a portion other than the eyes, corners of the mouth may be extracted as feature points.

The determiner 5241 detects a gaze direction based on the extracted image. The determiner 5241 extracts a region that includes eyes from the extracted image. A method for extracting an eye region can be freely selected. For example, a learning model that is similar to the face extract model 5244 or any other image processing method may be used. For example, the determiner 5241 determines the gaze direction based on an orientation of the face, in view of a tendency for a performer P to normally provide a cue by turning her/his face toward a person or persons to whom the cue is to be provided. The determiner 5241 determines the horizontal gaze direction in the face based on depth information on a symmetrical part of the face relative to the vertical centerline of the face, such as left and right eyes and eyebrows. In a case where a difference in distance from the depth camera between the left and right eyes is smaller than a predetermined threshold, and also in a case, for example, where the left and right eyes are deemed to be located at a substantially equal distance from the depth camera, the determiner 5241 determines that the face faces the front to the depth camera and the gaze direction corresponds to the front direction. A vertical gaze direction can be determined in a similar manner.

The determiner 5241 determines based on the detection result whether a preliminary gesture relating to a cue gesture indicative of a timing for an event is performed. The preliminary gesture is a part of the cue gesture or a gesture that leads to the cue gesture, and is a preliminary gesture that is performed before a timing such as a start of producing sound designated by the cue gesture. The preliminary gesture is, for example, a gesture of moving the face down (hereafter, "cue-down") that is performed before a gesture of moving the face up (hereafter, "cue-up") when the cue gesture involves nodding. In other embodiments, the preliminary gesture is, for example, a gesture of exhaling that is performed before a gesture of moving the face up when the cue gesture involves moving the face up while slightly inhaling.

The determiner 5241 determines that the preliminary gesture is performed in a case where a motion of the face is in a direction along a vertical axis, thereby indicating nodding (an example of "first direction"), and also when the gaze direction is toward a person or persons to be cued (an example of "second direction"). The determiner 5241 outputs a result of the determination on the preliminary gesture to the estimator 5242.

The estimator 5242 estimates a timing for generating an event from the image in which the preliminary gesture is indicated based on the determination result of the determiner 5241. For example, the estimator 5242 estimates a timing for generating an event by using a group of images indicative of a flow of a series of gestures including the preliminary gesture and the cue gesture estimation model 5245. The cue gesture estimation model 5245 is a learning model generated by causing the learning model to learn training data. The learning model is, for example, a long short-term memory (LSTM). The training data is a data set in which a series of images for learning, each of which is a captured image of a face including human eyes, are associated with a corresponding determination result for a cue gesture in each image for learning. The cue gestures in the training data may include various gestures for determining a cue gesture, and include gestures such as a cue gesture (cue-up), a preliminary gesture (cue-down), and a direction of a gaze, and others. By learning the training data, the cue gesture estimation model 5245 is trained as a model that estimates, from an input group of a series of images, a gesture indicated by a subsequent image within the series of images, to thereby output an estimation result. The determiner 5241 estimates a timing for generating an event based on the output obtained by inputting into the cue gesture estimation model 5245 the group of images indicative of the flow of the series of gestures including the preliminary gesture.

The outputter 5243 outputs information indicative of the timing for generating an event estimated by the estimator 5242.

The face extract model 5244 is a learning model that outputs a face of a human in an input image. The model was trained using as the training data a data set in which images for learning, each of which is a captured image of a face including human eyes, are associated with a corresponding determination result for a human face in each image for learning.

Figure 16:
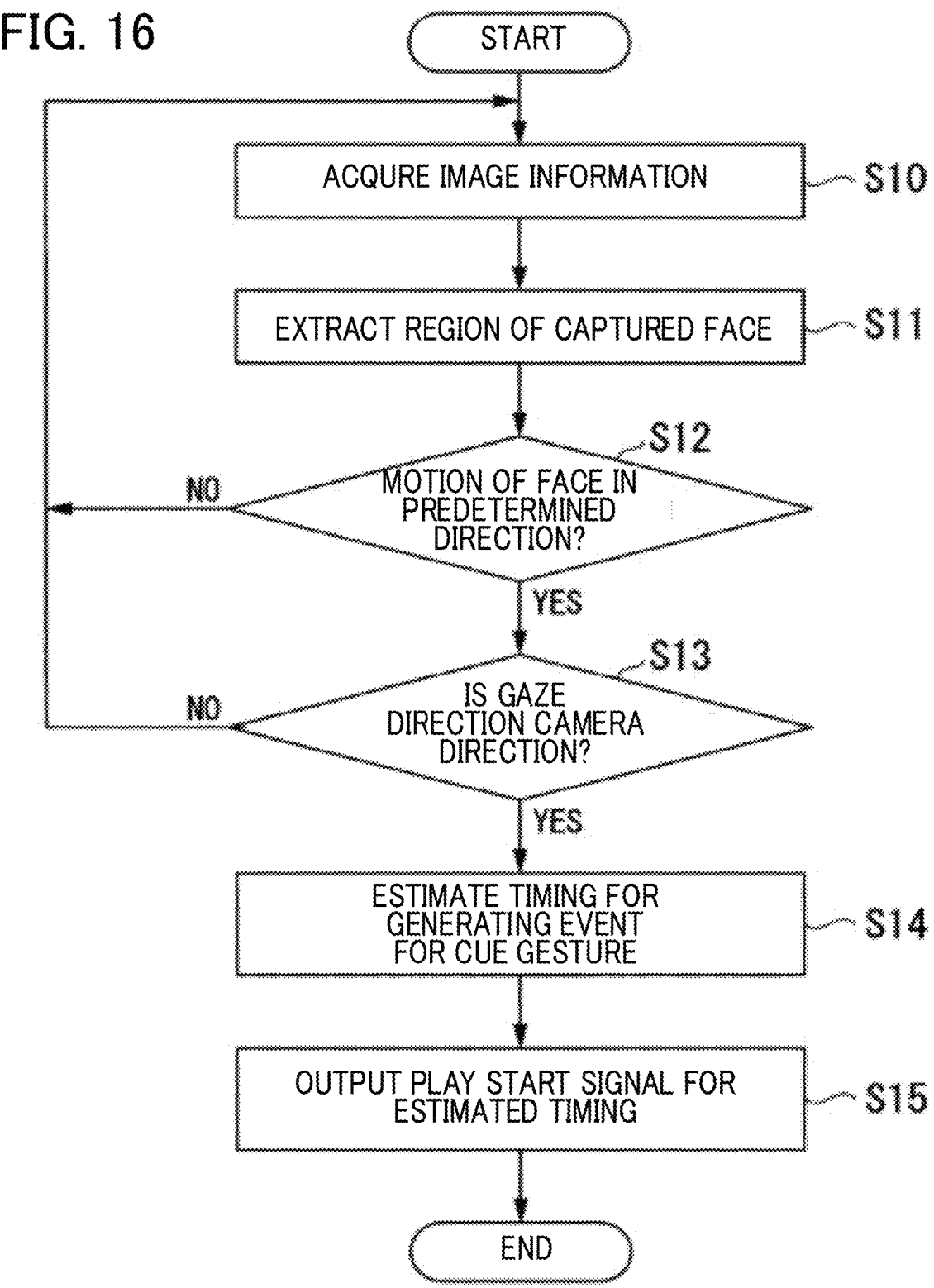
FIG. 16 is a flowchart illustrating an operation of the detection processor 524 according to the third embodiment.

The cue gesture estimation model 5245 is a learning model that outputs whether a cue gesture is performed in an input image. The model was trained using as the training data a data set in which a series of images for learning, each of which is a captured image of a face including human eyes, are associated with a corresponding determination result for a cue gesture in each image for learning, FIG. 16 is a flowchart illustrating a flow of processing performed by the detection processor 524.

The acquirer 5240 acquires image information. The acquirer 5240 outputs the acquired image information to the determiner 5241 (Step S10).

The determiner 5241 extracts, based on the image information, a region corresponding to a captured face within an image (Step S11), and detects the motion of the face and the gaze direction based on the extracted region of the image. The determiner 5241 determines whether the motion of the face is in a predetermined direction based on a result of the determination (Step S12). The determiner 5241 also detects whether the gaze direction is a specific direction (the direction toward the camera in FIG. 16) (Step S13). The determiner 5241 determines based on the motion of the face and the gaze direction whether the extracted image is an image in which a preliminary gesture relating to a cue gesture is performed, and outputs a result of the determination to the estimator 5242.

The estimator 5242 estimates a timing for generating an event based on the image information of an image in which it is determined by the determiner 5241 that the preliminary gesture is performed (Step S14). The estimator 5242 uses, for example, a group of images indicative of a flow of a series of gestures, including the preliminary gesture and the cue gesture estimation model 5245, to cause the cue gesture estimation model 5245 to estimate a gesture that will be about to be subsequently performed, and thereby estimate a timing for generating an event. The estimator 5242 outputs a result of the estimation to the outputter 5243.

The outputter 5243 outputs the estimation result estimated by the estimator 5242. The outputter 5243, for example, outputs a playback start signal corresponding to the estimated timing for generating the event (Step S15).

As has been described in the foregoing, the automatic player system (control system) 100 according to the third embodiment has the acquirer 5240, the determiner 5241, the estimator 5242, and the outputter 5243. The acquirer 5240 acquires image information. In a case where a face including eyes of a person is present in the captured image indicated by the image information, the determiner 5241 detects, based on the image information, a motion of the face and the gaze direction of the person. The determiner 5241 then determines by using the detected result whether a preliminary gesture relating to a cue gesture indicating a timing for generating an event is performed. The estimator 5242 estimates, based on the image information, a timing for generating an event in a case where it is determined by the determiner 5241 that a preliminary gesture is performed. The outputter 5243 outputs a result of the estimation estimated by the estimator 5242.

By use of the above configuration, the automatic player system 100 according to the third embodiment can estimate a timing for generating an event based on a motion of a face. Thus, it is possible to control performance by the automatic player system 100 based on a cue gesture indicated by the facing direction of a face of a performer P and her/his gaze direction in scenes in performing a piece of music where a cue by eye contact is likely to be given, such as matching a timing of start of producing sound, matching a recovery timing from a fermata, matching a start and stop timing of a final sound of the piece of music, and others.

In the third embodiment, an estimation is carried out using a captured image of a face including eyes. In a captured image of a performer P who is a wind player or the like, in some cases a face of the performer P may be partially occluded by an object such as a musical instrument (occlusion occurs). According to the third embodiment, however, it is possible to recognize a cue gesture by using a surrounding portion of eyes where occlusion is unlikely to occur, and estimate a timing for generating an event. Therefore, robustness of estimation is attained even when various gestures are performed when performing a piece of music. In the third embodiment, both a motion of a face and a gaze direction are used for the estimation. In this way, it is possible to distinguish between a cue gesture, and a facial or bodily movement of a performer P due to being too concentrated in playing. Accordingly, estimation accuracy can be enhanced as compared with a case in which only the motion of the face is used for estimation.

Furthermore, in the automatic player system 100 according to the third embodiment, the estimator 5242 uses the cue gesture estimation model 5245 to estimate a timing for generating an event. Accordingly, it is possible to carry out estimation by use of a simple method of inputting an image to the model, without need for performing complex image processing. As a result, a processing burden and time can be reduced as compared with a method that depends on complex image processing. Further, it is possible to enable a timing estimation for any event, since, by learning of the training data by the cue gesture estimation model 5245, a timing can be estimated for various events such as a start of producing sound, tempo cycles, and others.

Still further, in the automatic player system 100 according to the third embodiment, the determiner 5241 determines, based on the image information, that a preliminary gesture is performed in a case where it is determined that the motion of the face is in the direction along a vertical axis indicative of nodding (specific first direction) and that the gaze direction is in the direction toward a person or persons to be cued (specific second direction). By this configuration, it is possible to make a determination based on the movement in the specific direction and the specific gaze direction, both of which are distinctive as cue gestures, thereby enabling an accuracy of determination to be enhanced.

Further, in the automatic player system 100 according to the third embodiment, the determiner 5241 uses the face extract model 5244 to detect a motion of a face. Accordingly, the same effects as those described above are attained.

Further, in the automatic player system 100 according to the third embodiment, the image information includes depth information indicative of a distance between the camera and an object for each of pixels in an image. The determiner 5241 extracts a face from an image by separating a background from a captured image. Since an eye region in a face is relatively small, a number of pixels in the eye region extracted from the image is less than the number of pixels for other regions. A shape and color of eyes are more complex as compared with other regions of the face. Consequently, noise tends to be present in an image of an eye region even when the eye region has been accurately extracted; and thus precise detecting of orientation of the face cannot be easily accomplished if image processing of an image of an extracted eye region is used to determine an orientation of the face. In contrast, the present embodiment employs depth information. Variance in the depth information for the surrounding area tends to be less complex as compared to color information and the like. Thus, based on depth information around the eyes, the orientation of the face can be accurately detected. Also, since an approximate distance from the image capturers 222 to a performer P can be determined in advance, the use of the depth information enables extraction of the performer P by ready separation of the background from an image without carrying out complex image processing such as extracting contours of the performer P. By removing pixels corresponding to the background from an image for analysis, not only is processing expedited, but also erroneous detection can minimized.

In the foregoing description, an example is given of a case in which the gaze direction is detected based on image information. However, but the present disclosure is not limited thereto. For example, the gaze direction may be detected by using eye tracking or the like, in which a relative positional relationship between the cornea and the pupil detected based on a reflected light of infrared rays towards the eyeballs is used to detect a gaze direction.

Further, an ensemble agent may respond, with use of the automatic player system 100 according to the third embodiment. For example, when a performer P looks at a robot in which a camera is installed, the robot may be configured to perform a gesture of looking at the performer P. Still further, when the performer P carries out a cue gesture (e.g., cue-up) or a preliminary gesture (e.g., cue-down), the robot nods in accordance with the gesture. Thus, it is possible to produce a rendition in which the automatic player system 100 is attuned to the performer P.

It is understood that the various embodiments of the present disclosure described herein are given by way of example only, and are not intended to limit the scope of the disclosure. These embodiments can be implemented in other various embodiments, and omissions, substitutions, or modifications may be made so long as they do not depart from the spirit of the disclosure. These embodiments and variations thereof are included in the scope and the spirit of the disclosure, and are included in the scope of the disclosure as set forth in the appended claims and the equivalents thereof.

What is claimed is:

1. A control system comprising:
   at least one processor; and
   a memory that is operatively coupled to the at least one processor and that is configured to store instructions executable by the processor, wherein upon execution of the instructions the processor is caused to:
   acquire image information including images of a user captured over time;
   determine whether a preliminary gesture relating to a cue gesture is performed based on a motion of a face of the user and a gaze direction of the user, where the cue gesture is indicative of a timing for generating an event and the motion of the face and the gaze direction are detected from the image information;
   estimate a timing for generating an event in a case where it is determined that the preliminary gesture is performed; and
   output a result of the estimation.

2. The control system according to claim 1, wherein the processor is configured to estimate the timing for generating the event using a result of an output of a cue gesture estimation model that outputs whether a cue gesture is performed in an input image, where the cue gesture estimation model is trained using as training data a data set in which an image for learning obtained by capturing a face including human eyes is associated with a result of determination for a cue gesture indicative of a timing for generating the event in the image for learning.

3. The control system according to claim 1, wherein:
   an event indicated by a cue gesture indicative of a timing for generating the event is a start of sound production, and
   the processor is configured to, in estimating the timing for generating the event, estimate a timing indicative of a start of sound production using a cue gesture estimation model, wherein the cue gesture estimation model is indicative of a result of learning relations among images and cue gestures, where each of the cue gestures is a motion of a face including human eyes, the motion indicating a start of sound production.

4. The control system according to claim 1, wherein:
   an event indicated by a cue gesture indicative of a timing for generating the event is a tempo cycle in playing music, and
   the processor is configured to, in estimating the timing for generating the event, estimate a timing indicative of a tempo cycle in playing music using a cue gesture estimation model, wherein the cue gesture estimation model is indicative of a result of learning relations between images and cue gestures, where each of the cue gestures is a motion of a face including human eyes, the motion indicating a tempo cycle in playing music.

5. The control system according to claim 1, wherein the processor is configured to, in determining whether the preliminary gesture is performed, determine, based on the image information, that the preliminary gesture is performed in a case where it is determined that the motion of the face including human eyes is in a specific first direction and also that the gaze direction is a specific second direction.

6. The control system according to claim 1, wherein in determining whether the preliminary gesture is performed, the processor is configured to:
   extract the face of the user from each of the captured images indicated by the image information by using a result of an output of a face extract model that outputs a face of a person in an input image, where the face extract model is trained by learning as training data a data set in which an image for learning obtained by capturing a face including human eyes and a result of determination for the face in the image for learning; and detect the motion of the face based on images of the extracted face.

7. The control system according to claim 1, wherein:

the image information includes depth information indicative of a distance to an object for each pixel in each of the captured images, and in determining whether the preliminary gesture is performed, the processor is configured to:

for each captured image, separate and remove based on the depth information a background from the captured image indicated by the image information, and extract a face including human eyes from the captured image, based on an image obtained by separating and removing the background.

8. A control method comprising:

acquiring image information including images of a user captured over time;

determining whether a preliminary gesture relating to a cue gesture is performed based on a motion of a face of the user and a gaze direction of the user, where the cue gesture is indicative of a timing for generating an event and the motion of the face and the gaze direction are detected from the image information;

estimating a timing for generating an event in a case where it is determined that the preliminary gesture is performed; and outputting a result of the estimation.

9. The control method according to claim 8, wherein the estimating includes estimating the timing for generating the event using a result of an output of a cue gesture estimation model that outputs whether a cue gesture is performed in an input image, where the cue gesture estimation model is trained using as training data a data set in which an image for learning obtained by capturing a face including human eyes is associated with a result of determination for a cue gesture indicative of a timing for generating the event in the image for learning.

10. The control method according to claim 8, wherein:

an event indicated by a cue gesture indicative of a timing for generating the event is a start of sound production, and the estimating the timing for generating the event includes estimating a timing indicative of a start of sound production using a cue gesture estimation model, wherein the cue gesture estimation model is indicative of a result of learning relations among images and cue gestures, where each of the cue gestures is a motion of a face including human eyes, the motion indicating a start of sound production.

11. The control method according to claim 8, wherein:

an event indicated by a cue gesture indicative of a timing for generating the event is a tempo cycle in playing music, and the estimating the timing for generating the event includes estimating a timing indicative of a tempo cycle in playing music using a cue gesture estimation model, wherein the cue gesture estimation model is indicative of a result of learning relations between images and cue gestures, where each of the cue gestures is a motion of a face including human eyes, the motion indicating a tempo cycle in playing music.

12. The control method according to claim 8, wherein the determining whether the preliminary gesture is performed includes determining, based on the image information, that the preliminary gesture is performed in a case where it is determined that the motion of the face including human eyes is in a specific first direction and also that the gaze direction is a specific second direction.

13. The control method according to claim 8, wherein the determining whether the preliminary gesture is performed includes:

extracting the face from each of the captured images indicated by the image information by using a result of an output of a face extract model that outputs a face of a person in an input image, where the face extract model is trained by learning as training data a data set in which an image for learning obtained by capturing a face including human eyes and a result of determination for the face in the image for learning; and detecting the motion of the face based on images of the extracted face.

14. The control method according to claim 8, wherein:

the image information includes depth information indicative of a distance to an object for each pixel in each of the captured images, and the determining whether the preliminary gesture is performed includes:

for each captured image, separating and removing based on the depth information a background from the captured image indicated by the image information, and extracting a face including human eyes from the captured image, based on an image obtained by separating and removing the background.

* * * * *